US008837715B2

(12) United States Patent
Troncoso Pastoriza et al.

(10) Patent No.: US 8,837,715 B2
(45) Date of Patent: Sep. 16, 2014

(54) METHOD AND APPARATUS FOR SECURE ITERATIVE PROCESSING AND ADAPTIVE FILTERING

(75) Inventors: Juan Ramón Troncoso Pastoriza, Vigo (ES); Fernando Pérez González, Vigo (ES)

(73) Assignee: Gradiant, Centro Tecnolóxico de Telecomunicacións de Galica, Vigo (ES)

( * ) Notice: Subject to any disclaimer, the term of this patent is extended or adjusted under 35 U.S.C. 154(b) by 0 days.

(21) Appl. No.: 13/364,598

(22) Filed: Feb. 2, 2012

(65) Prior Publication Data

US 2012/0213359 A1    Aug. 23, 2012

Related U.S. Application Data

(60) Provisional application No. 61/443,823, filed on Feb. 17, 2011.

(51) Int. Cl.
*H04L 9/28*   (2006.01)
*H04L 9/00*   (2006.01)

(52) U.S. Cl.
CPC ..................................... *H04L 9/008* (2013.01)
USPC ................................. 380/28; 380/29; 380/30

(58) Field of Classification Search
CPC ........................................................ H04L 9/008
USPC ..................................................... 380/26–30
See application file for complete search history.

(56) References Cited

U.S. PATENT DOCUMENTS

| | | | |
|---|---|---|---|
| 7,218,730 B2 * | 5/2007 | Ittycheriah et al. | 379/406.01 |
| 7,526,084 B2 | 4/2009 | Smaragdis et al. | |
| 8,130,947 B2 | 3/2012 | Kerschbaum et al. | |
| 8,161,463 B2 | 4/2012 | Johnson et al. | |
| 8,433,925 B2 | 4/2013 | Troncoso Pastoriza et al. | |
| 2002/0085710 A1* | 7/2002 | Ananth | 380/37 |
| 2004/0071207 A1* | 4/2004 | Skidmore et al. | 375/233 |
| 2005/0053020 A1* | 3/2005 | Thirumoorthy | 370/286 |
| 2007/0116283 A1 | 5/2007 | Tuyls et al. | |
| 2007/0156677 A1* | 7/2007 | Szabo | 707/5 |
| 2009/0202070 A1* | 8/2009 | Mantin et al. | 380/44 |
| 2009/0279694 A1 | 11/2009 | Takahashi et al. | |
| 2010/0046751 A1* | 2/2010 | Kobayashi | 380/201 |

(Continued)

OTHER PUBLICATIONS

Juan Ramon Troncoso-Pastoriza and Fernando Perez Gonzalez, Secure Adaptive Filtering, IEEE Transactions on Information Forensics and Security, vol. 6, No. 2, Jun. 2011.

(Continued)

*Primary Examiner* — Haresh N Patel
(74) *Attorney, Agent, or Firm* — Mateo Aboy; Aboy & Associates PC

(57) ABSTRACT

Disclosed embodiments include methods and apparatuses for secure iterative processing of encrypted signals based on implementing a secure iterative processing protocol that avoids cipher blowup, and applying an iterative algorithm directly on the encrypted signals to generate an encrypted processed output signal. In a particular embodiment, the protocol comprises applying homomorphic linear processing, preparing and applying a rescaling module to avoid cypher blowup, and homomorphically adapting the encrypted signals. Specific embodiments implement iterative adaptive filtering algorithms in the encrypted domain including non-collaborative secure filtering and two-party filtering based on homomorphic encryption, interactive secure protocols, garbled circuits, or a combination thereof.

16 Claims, 10 Drawing Sheets

(56) References Cited

U.S. PATENT DOCUMENTS

| | | | |
|---|---|---|---|
| 2010/0106964 A1 | 4/2010 | Hirata et al. | |
| 2010/0205041 A1* | 8/2010 | Rathod et al. | 705/10 |
| 2010/0329448 A1* | 12/2010 | Rane et al. | 380/28 |
| 2011/0033037 A1* | 2/2011 | Mazurenko et al. | 379/406.08 |
| 2011/0060901 A1* | 3/2011 | Troncoso Pastoriza et al. | 713/150 |
| 2011/0060918 A1 | 3/2011 | Troncoso Pastoriza et al. | |
| 2011/0110525 A1 | 5/2011 | Gentry | |
| 2011/0211692 A1* | 9/2011 | Raykova et al. | 380/46 |
| 2011/0216902 A1* | 9/2011 | Kolesnikov | 380/47 |
| 2011/0280394 A1* | 11/2011 | Hoover | 380/28 |
| 2012/0039463 A1 | 2/2012 | Gentry et al. | |
| 2012/0070000 A1* | 3/2012 | Baechler et al. | 380/255 |
| 2012/0172050 A1* | 7/2012 | Ledlie et al. | 455/456.1 |

OTHER PUBLICATIONS

Craig Gentry.2009, Fully Homomorphic Encryption Using Ideal Lattices. In Proceedings of the 41st annual ACM symposium on Theory of computing (STOC'09). ACM, New York, NY, USA, 169-178. DOI=10.1145/1536414.1536440.

Kobbi Nissim and Enav Weinreb,Communication Efficient Secure Linear Algebra. Theory of Cryptography. Lecture Notes in Computer Science, 2006, vol. 3876/2006, 522-541, DOI: 10.1007/11681878_27.

Berry Schoenmakers, A Simple Publicly Verifiable Secret Sharing Scheme and Its Application to Electronic Voting. Advances in Cryptology—Crypto' 99. Lecture Notes in Computer Science, 1999, vol. 1666/1999, 784, DOI: 10.100713-540-48405-1_10.

Bickson, D.; Dolev, D.; Bezman, G.; Pinkas, B., "Peer-to-Peer Secure Multy-party Numerical Computation"Peer-to-Peer Computing, 2008. P"P '08. Eighth International Conference on, vol., No., pp. 257-266, Sep. 8-11, 2008 DOI: 10.1109/P2P.2008.22.

Marina Blanton, Empirical Evaluation of Secure Two-party Computation Models, 2005, Technical Report TR 2005-58.

Payman Mohassel and Matthew Franklin, Efficient Polynomial Operations in the Shared-Coefficients Setting, 2006, Lecture Notes in Computer Science, vol. 3958, Public Key Cryptography—PKC 2006, pp. 44-57.

Qingsong Ye, Privacy Preserving Dataset Operations, Mar. 2009, Macquarie University.

Troncoso-Pastoriza et al. (Juan Ramón Troncoso-Pastoriza, Pedro Comesaña, and Fernando Pérez-Gonzélez). Secure Direct and Iterative Protocols for Solving Systems of Linear Equations. In SPEED Workshop 2009, pp. 122-141, Lausanne, Switzerland, Sep. 2009.

Bianchi et al. (Bianchi, T., Piva, A., Barni, M.): On the implementation of the discrete Fourier transform in the encrypted domain. IEEE Transactions on Information Forensics and Security 4(1) (2009) 86-97.

Cramer et al. (Cramer, R., Damgard I.): Secure distributed linear algebra in a constant number of rounds. In: 21st Annual International Cryptology Conference on Advances in Cryptology. vol. 2139 of Lecture Notes in Computer Science., Springer (2001) 119-136.

Du et al. (Du, W., Atallah, M.J.): Privacy-preserving cooperative scientific computations. In: Proceedings of the 14th IEEE Computer Security Foundations Workshop, Nova Scotia, Canada (Jun. 2001) 273-282.

Goethals et al. (Goethals, B., Laur, S., Lipmaa, H., Mielikainen, T.): On private scalar product computation for privacy-preserving data mining. In Park, C., Ghee, S., eds.: 7th Annual International Conference in Information Security and Cryptology (ICISC 2004). vol. 3506 of Lecture Notes in Computer Science., Seoul, Korea, Springer (Dec. 2004) 104-120.

Guo, C. and Higham N. J., A Schur-Newton method for the matrix p'th root and its inverse, 2006, SIAM Journal on Matrix Analysis and Applications, 28(3), 788-804.

Goldreich, O., Foundations of Cryptography: vol. 2 Basis Applications, 2004, Cambridge University Press, New York.

Hall, R; Flenberg, SE; Nardi, Y., Secure Multiple Linear Regression Based on Homomorphic Encryption, 2011, Journal of Official Statistics, v.27, p. 669.

* cited by examiner

METHOD AND APPARATUS FOR SECURE ITERATIVE PROCESSING AND ADAPTIVE FILTERING

CROSS-REFERENCE TO RELATED APPLICATIONS

This application claims the benefit of U.S. Provisional Application No. 61/443,823 filed on 2011-02-17 by the present inventors, which is incorporated herein by reference.

TECHNICAL FIELD

Disclosed embodiments relate to methods and apparatuses for secure iterative processing. Specifically, disclosed embodiments deal with methods and apparatuses for secure iterative processing of encrypted signals that avoid cipher blowup problems including secure iterative adaptive filtering.

BACKGROUND

In modern society, digital data about individuals that could be considered to be highly personal, can be found relatively easily in the communication networks, especially the Internet. Although most people support the last decades' advances in digital networks, the sensitiveness of these data motivates an increasing concern about the public availability of personal data and the processing performed on them. On the other hand, signal processing researchers have traditionally focused on continuously improving the efficiency and robustness of the applied algorithms, while often leaving aside the crucial aspect of data privacy. Thus, advances in signal processing have not taken into account the trustworthiness of the parties that manage users' signals or the sensitiveness of the information contained within these signals. There are many application scenarios where the need for privacy is clearly present, mainly those in which biological signals (fingerprints, faces, iris, Deoxyribonucleic acid (DNA), Electrocardiogram (ECG) signals, Arterial Blood Pressure (ABP) signal, Magnetic Resonance Images (MRI), etc) are involved, as they hold extremely sensitive information about users or patients, and their privacy is traditionally addressed through written consents that represent the trust that users must put on the party or parties that process their signals.

Signal Processing in the Encrypted Domain (SPED) is an emergent research field that has arisen to effectively tackle the privacy problems involving signal processing. As an interdisciplinary area, it has faced from its birth the challenge of bringing together the views of the cryptographic and the signal processing communities in order to reach the target of efficiently applying privacy preserving techniques to common signal processing operations.

The theoretical grounds of Signal Processing in the Encrypted Domain come from the field of secure function evaluation, that was introduced by Yao in 1982 [1] (Secure two-party computation) through the now widely known Millionares' problem, and then generalized to Secure Multiparty Computation [2] (SMC). In the former setting, two millionaires wish to know who is the richest, without disclosing to the other their respective wealth. The solution proposed by Yao was based on the concept of garbled circuits. In spite of the generality of the presented solution, the inefficiency of its implementation for many applications has constituted the biggest obstacle for the development of this technology for many years, in such a way that the existence of efficient solutions for the secure execution of a generic function is still an open problem. Nonetheless, many efficient and secure techniques have been developed for specific applications in the past few years, building up a set of tools that foretell the potential of this technology.

Within this set of tools, the most efficient SPED primitives are those that exploit the properties of homomorphic encryption for performing some linear fixed operations, but most of the times Signal Processing needs to go further, resorting to adaptive filtering algorithms, due to their greater flexibility, higher responsiveness when tracking the changes in the environment, their convergence to the optimal fixed solution when working in a stationary environment, and the fact that they are the optimal solution in settings where the information about the signal characteristics is not complete, offering a much better performance than fixed filters. Hence, a considerable number of practical signal processing applications make use of adaptive filters. Unfortunately, the current homomorphic cryptosystems cannot directly deal with adaptive filters due to cipher blowup after a given number of iterations; on the other hand, full homomorphisms, like Gentry's [3], able of executing any circuit without the need of decryption, are still not practical, due to the huge size needed for the ciphertexts. In fact, the existence of practical fully homomorphic cryptosystems is still an open problem. Even though there are some linear transforms and basic operations that can be directly translated into homomorphic processing, the set is too limited, and when privacy is a concern, the solution cannot impose that these operations be replaced by simpler non-adaptive algorithms, as the negative impact on performance could virtually destroy the usefulness of the algorithm. This is especially true when the involved signals are not stationary, and the filter must track their changes over time.

Related work on private linear filtering has been presented as part of the Signal Processing in the EncryptEd Domain (SPEED) project [4], dealing with the privacy problem in a two-party setting where one party has an input to a linear filter and another party holds the filter coefficients. Such efficient privacy-preserving solutions are based solely on homomorphic processing, as it fits perfectly the linear filtering operation without imposing any overhead on communication. Within the area of linear filtering, we can point out the works by Bianchi et al. [5-7], dealing with encrypted Discrete Fourier Transform (DFT) and Discrete Cosine Transform (DST) and frequency-domain linear filtering. Additionally, these works discuss also the problem of disclosing data derived from the inputs without any dimensionality reduction, as the original data can be inferred from the disclosed outputs.

There have been also some contributions for more complex operations, involving the combination of garbled circuits and homomorphic processing, most notably those from Kolesnikov et al. [8], in which homomorphic processing is used for the linear operations, while garbled circuits deal with non-linear operations.

Regarding the privacy considerations in iterative algorithms, there are some contributions in the area of private collaborative filtering, like those by Canny [9] and Erkin [10]. In the former, Canny developed a privacy-preserving iterative conjugate gradient algorithm for the calculation of the Singular Value Decomposition (SVD) of a shared preference matrix P. The setting in [9] addresses a particular problem as follows: a) it involves multiple parties, and the gradient estimate in each iteration is calculated as the sum of the contributions from each of these parties; b) the result of every iteration is decrypted and disclosed before the next iteration; hence, it does not involve successive products of encrypted values, as each party uses only clear-text values for producing the results at every iteration; c) as a drawback, the disclosure of the approximation of the preference matrix and the global gradient calculated at each iteration are publicly known; hence, the security relies on those matrices having a very high dimension and the system having a very high number of users. However, when dealing with protecting the signals coming from one party during their adaptive filtering by another untrusted party; in this setting, Canny's solution loses its privacy properties, as the value disclosed after each iteration allows each party to calculate the secret input from the other party. Furthermore, it is necessary to keep all the intermediate values encrypted in order to effectively preserve the privacy of the involved users, and this involves repeated products of encrypted numbers that will have direct consequences on the viability of the used privacy-preserving techniques due to the cipher blowup problem.

Other private iterative algorithms involve K-means clustering of a database shared between two parties, like the one proposed by Jagannathan et al. [11]; again, in this setting, the results of each iteration (the current classification of the elements) are disclosed before the next, and the security relies on the dimensionality of the databases, unlike the case of private adaptive filtering.

Currently, there are no specific solutions within the emerging field of Signal Processing in the Encrypted Domain for securely executing iterative or adaptive filtering algorithms, nor any study performed on the impact that an iterative implementation has on the range of representable numbers when the results of each iteration cannot be disclosed. Consequently, there are currently no solutions dealing with privacy preserving adaptive filtering algorithms.

SUMMARY

Disclosed embodiments include methods and apparatuses for secure iterative processing of encrypted signals based on implementing a secure iterative processing protocol that avoids cipher blowup, and applying an iterative algorithm directly on the encrypted signals to generate an encrypted processed output signal. In a particular embodiment, the protocol comprises applying homomorphic linear processing, preparing and applying a rescaling module to avoid cypher blowup, and homomorphically adapting the encrypted signals. Specific embodiments implement iterative adaptive filtering algorithms in the encrypted domain including non-collaborative secure filtering and two-party filtering based on homomorphic encryption, interactive secure protocols, garbled circuits, or a combination thereof.

BRIEF DESCRIPTION OF THE DRAWINGS OF EMBODIMENTS

Disclosed embodiments are illustrated by way of example, and not by way of limitation, in the figures of the accompanying drawings.

$n_x=32$, $n_f=16$.

Figure 8:
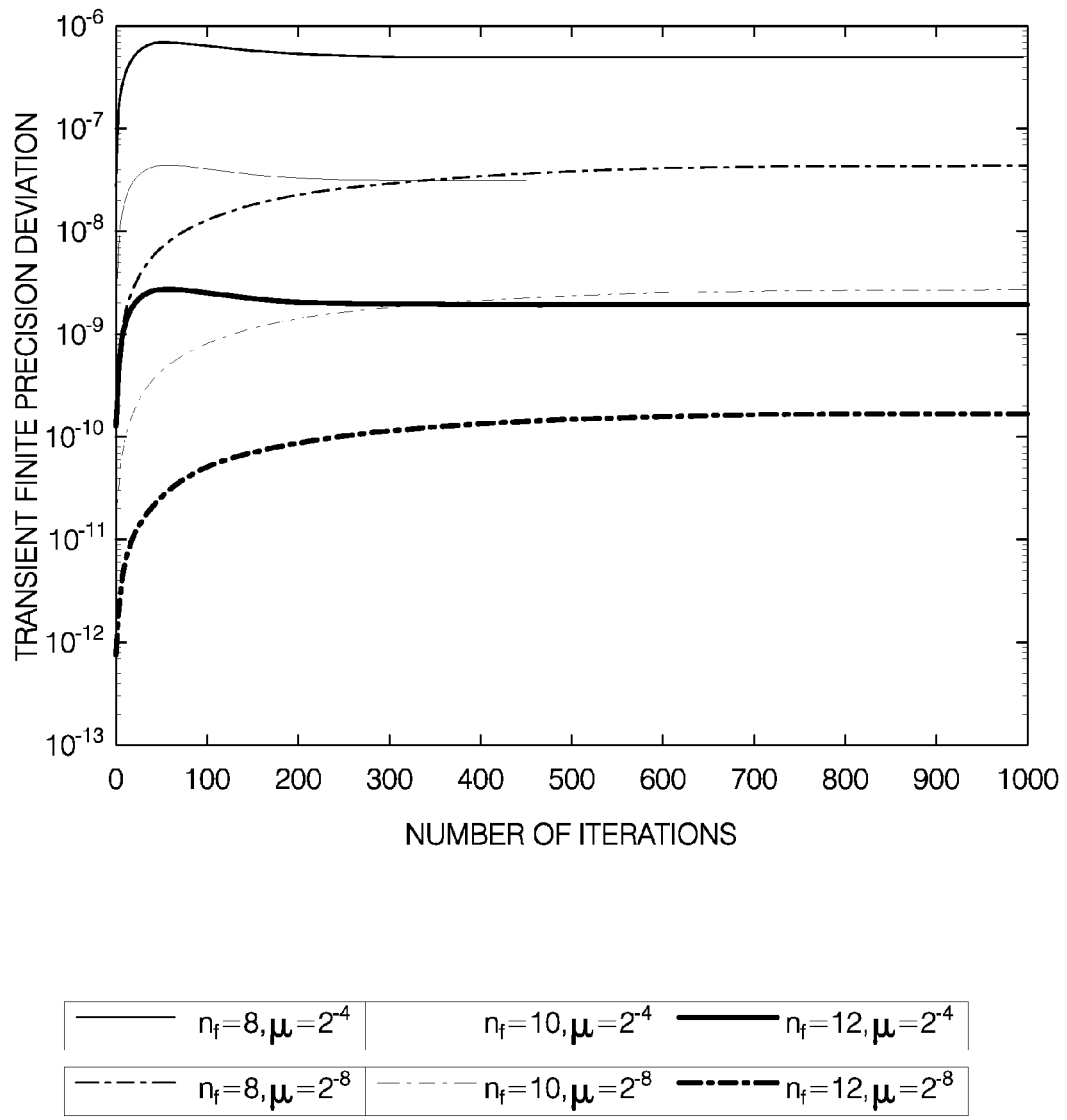

FIG. 8 shows the excess error during the transient period for the hybrid protocol, with $n_x=48$, and a 4-tap adaptive filter.

Figure 9:
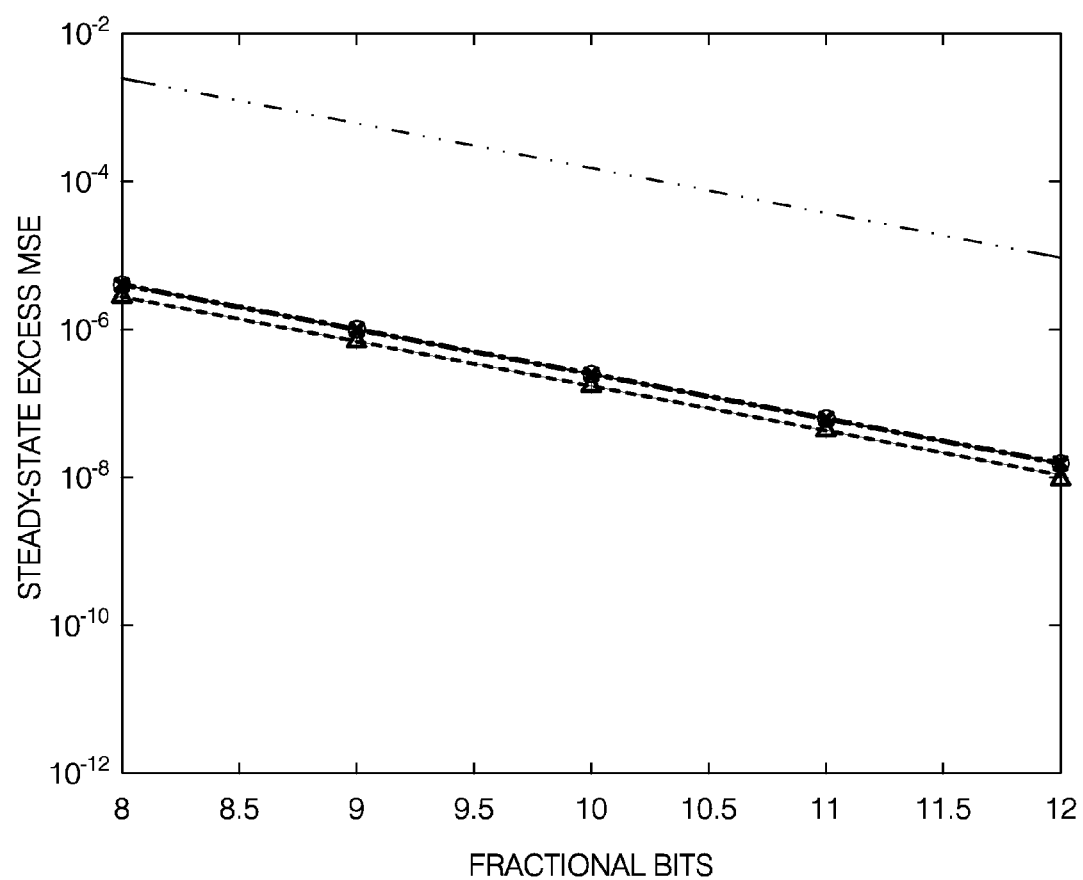
Figure 9:
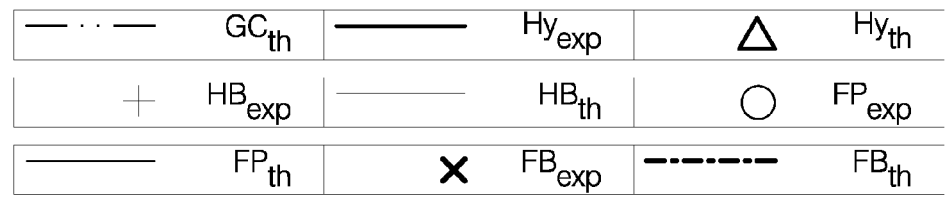

FIG. 9 shows the steady-state excess error for varying fractional precision, with $n_x=48$, and 12-tap adaptive filter, packing $N_b=N_E=12$ coefficients in the block protocols.

Figure 10:
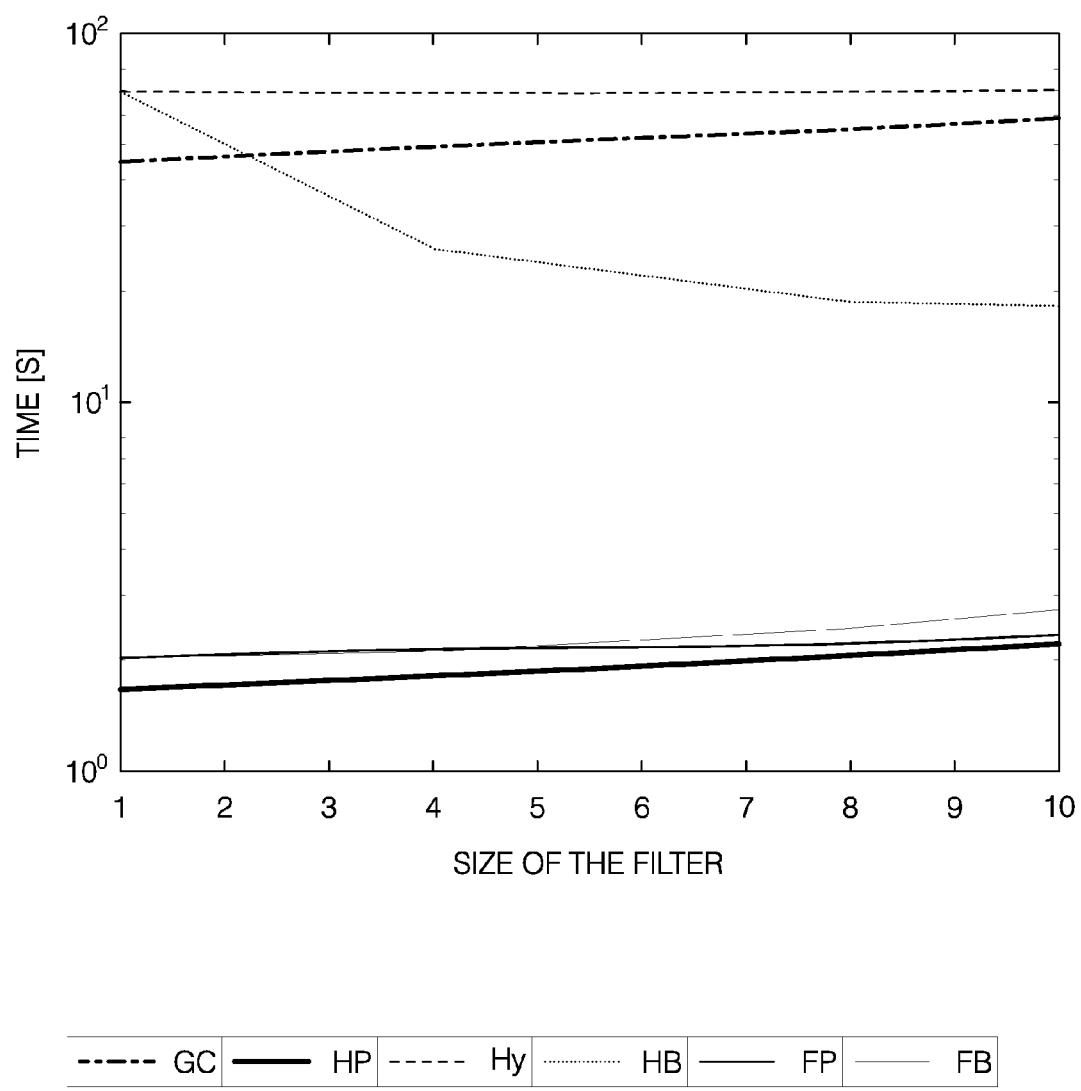

FIG. 10 shows the aggregated computation time for 2048 bits moduli, $|E_C|=224$, $n_{sec}=80$, $n_x=32$, $n_f=16$, 48 iterations and increasing filter size and maximum packed coefficients.

DESCRIPTION OF EMBODIMENTS

Overall Method Description

Figure 1:
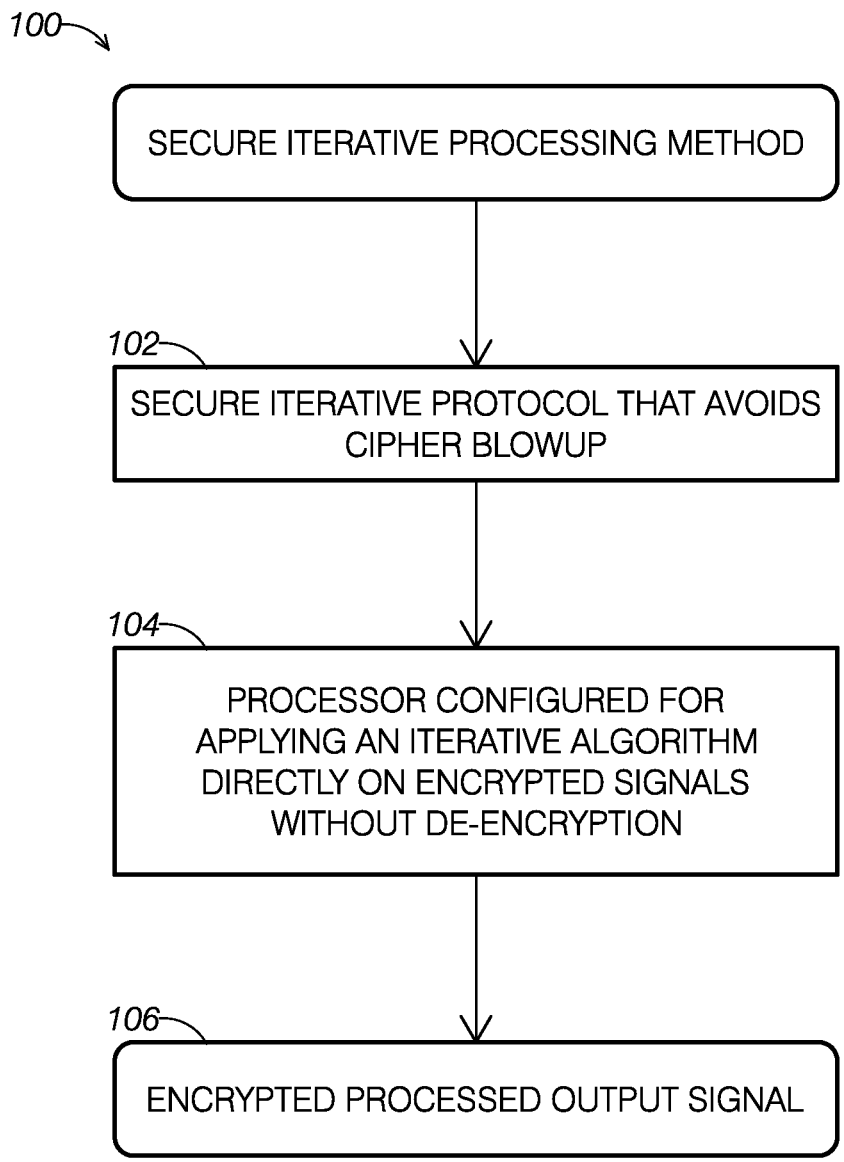
FIG. 1 shows a block diagram according to one embodiment of the general method.

According to one embodiment, and without limitation, a method for secure iterative processing of encrypted signals is disclosed. As shown in a particular embodiment in FIG. 1, the secured iterative processing method 100 comprises (a) implementing a secure iterative processing protocol that avoids cipher blowup 102; (b) applying an iterative algorithm directly on said encrypted signals to generate an encrypted processed output signal 104; and (c) outputting the encrypted processed signal 106. In one embodiment, the cipher blowup problem is solved by implementing a protocol based on applying homomorphic linear processing and applying a rescaling module. In a general embodiment, the method homomorphically adapts the encrypted signals and continues generating encrypted outputs until iterative processing is completed. Consequently, the method provides an efficient secure solution for any iterative algorithm executed in non-trusted environments (being the main contribution the solution to the cipher blowup problem), that is, it provides a solution to the problem of secure iterative processing. The details the solution to the cypher blowup problem according to several embodiments are provided below.

According to a particular embodiment, the private iterative processing protocol and the iterative algorithm implement an iterative adaptive filtering algorithm by homomorphically adapting the encrypted signals. The adaptive algorithm can be a stochastic gradient algorithm, a square-root adaptive filter, an order recursive adaptive filter, a fast transversal filter, or a combination thereof. As an example, and without limitation, particular embodiments of the method include the implementation of adaptive filtering algorithms such as Least Mean Squares (LMS), Block Least Mean Squares (BLMS), Recursive Least Squares (RLS), QR decomposition based Recursive Least Squares (QR-RLS), inverse QR-RLS, The QR Decomposition based Least Squares Lattice (QRD-LSL), recursive Least Squares Lattice (LSL), Gradient Adaptive Lattice (GAL), or a combination thereof executed directly the encrypted domain (i.e., without decrypting the data or signals). This embodiment provides a secure solution for any (iterative) adaptive filtering algorithm executed in non-trusted environments, including any family of adaptive algorithms based on the solutions disclosed below.

According to a particular embodiment, and without limitation, the private iterative processing protocol implements a non-collaborative secure adaptive filter. In particular, the non-collaborative secure adaptive filter is based on data coming from one party or a group of parties and said adaptive filter coming from a second party or a group of parties with privacy bidirectionally preserved. Note that most of the related art deals with collaborative filtering; the latter problem copes with filters (known by every data owner) that affect a large amount of data distributed among a large number of parties. The proposed embodiment and scenario differs completely from this one, in the sense that it deals with the separation of data and processing: data come from a party or group of parties, and the algorithm with which these data are processed comes from another party or group of parties; privacy must be bidirectionally preserved.

In a particular embodiment, the private iterative processing protocol implements a two-party secure adaptive filtering. In this case, a party is not necessarily considered as an individual, but as an entity that can comprise a plurality of individuals or institutions. More particularly, according to one embodiment, the method implements a two-party secure adaptive filtering comprising applying homomorphic encryption, applying interactive secure protocols, applying garbled circuits, or a combination thereof. Particular embodiments of the two-party secure adaptive filtering are based on a hybrid adaptive filtering method, a rounding and unpacking method, a homomorphic processing (HP) privateLMS protocol, a garbled circuit (GC) privateLMS protocol, a hybrid (Hy) privateLMS protocol, a hybrid block (HB) privateLMS protocol, or a combination thereof. Each of these methods and protocols are disclosed in the specification (TABLES 1-5) and FIG. 2-4.

Figure 2:
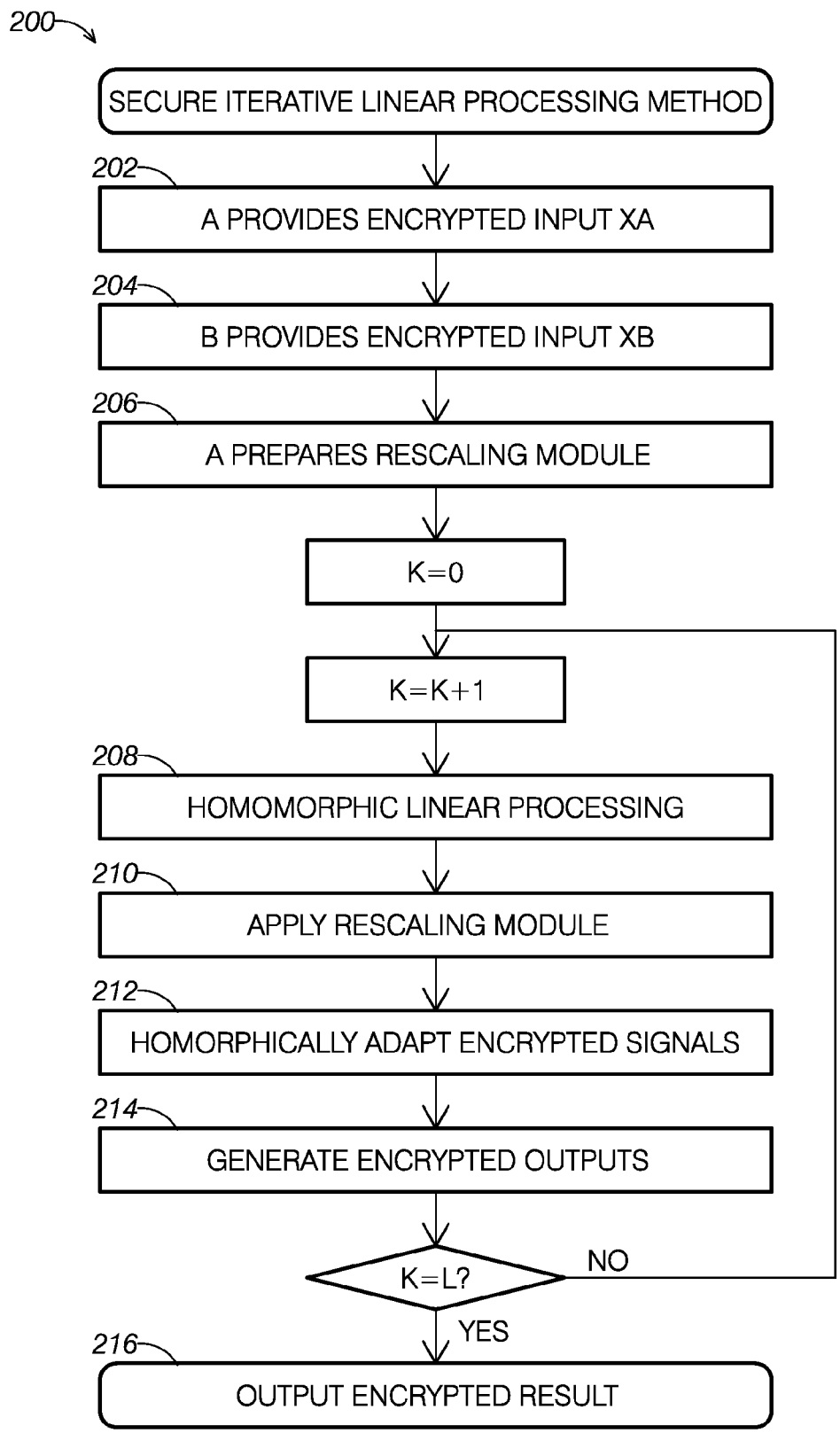
FIG. 2 shows a block diagram according to one embodiment of the method implementing a secure iterative linear processing method.

As shown in a particular embodiment in FIG. 2, the secure iterative linear processing method 200 is performed between two parties A and B, such that both parties provide their respective encrypted input ($x_A$ for party A 202 and $x_B$ for party B 204), each with L elements; party A prepares a rescaling module 206 that will be executed in each iteration 210 for avoiding cipher blow-up after performing a homomorphic processing on the received inputs 208. The preprocessed and rescaled signals undergo another homomorphic processing step 212 that produces the encrypted outputs 214 for each iteration. Once all iterations are performed, the protocol stops; the encrypted outputs are available 216 to the corresponding party or parties.

Figure 3:
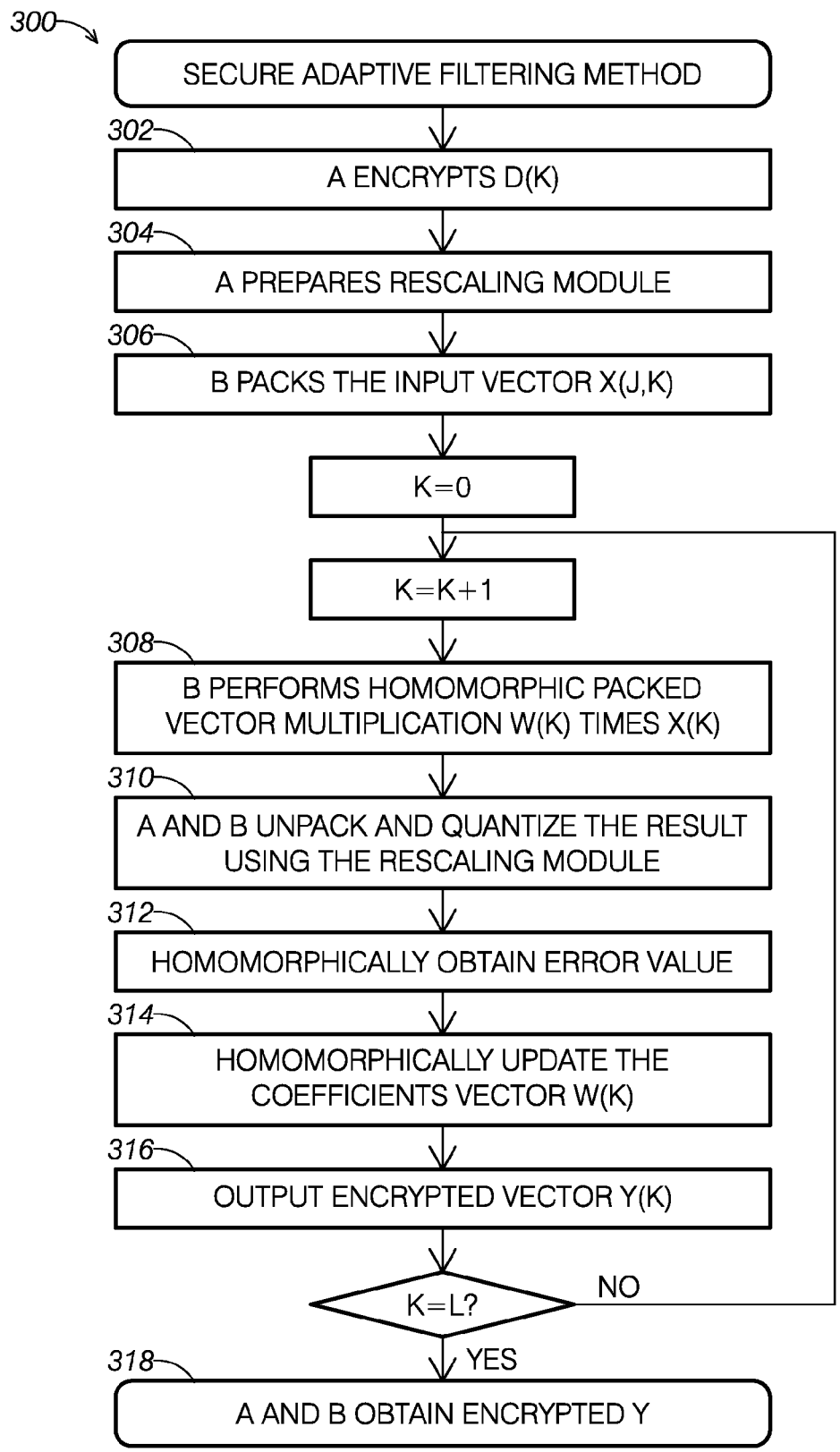
FIG. 3 shows a block diagram according to one embodiment of the method implementing a hybrid adaptive filtering method

As shown in a particular embodiment in FIG. 3, the secure adaptive filtering method 300 is performed between two parties A and B, such that A provides input D and B provides input X. A encrypts her inputs 302 and prepares a rescaling module 304, and sends the corresponding encrypted elements of D to B. B may pack the input vector for increased performance 306. For each of the elements of D, B performs the filtering of the corresponding components of the input X with the current encrypted coefficients of the adaptive filter W 308. The encrypted vectorial result is unpacked (if needed) and quantized by both A and B 310 using the rescaling circuit provided by A. The encrypted result is used to homomorphically obtain an encrypted error value E 312. This encrypted error value and the corresponding input is used by B to homomorphically update the encrypted filter coefficient vector W 314. For each iteration, a block of the encrypted filtered output Y is produced 316. After L iterations, the method stops, and the encrypted outputs are available 318 to the corresponding party or parties.

Figure 4:
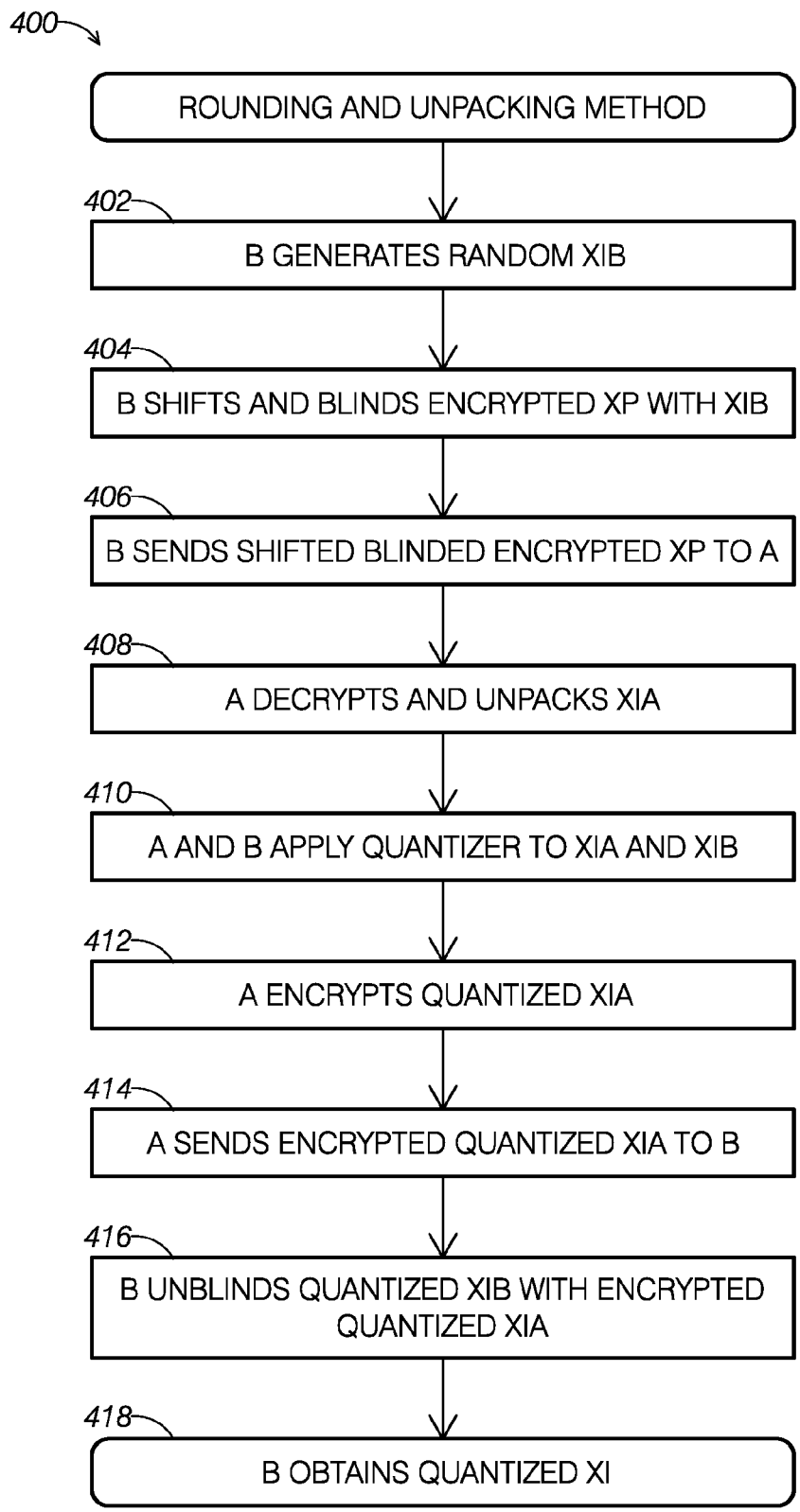
FIG. 4 shows a block diagram according to one embodiment of the method implementing a rounding and unpacking method.

As shown in a particular embodiment in FIG. 4, the secure rounding and unpacking method 400 is performed between two parties A and B; the protocol takes the encrypted inputs $\{X_I\}_{I=0}^{M-1}$, packed into an encrypted value $X^P$ (if M=1 then $X^P=X_1$), that B owns, and unpacks (if necessary) and rounds them in encrypted form. For that purpose, B generates a random vector $\{X_I^B\}_{I=0}^{M-1}$ 402, and uses it to homomorphically shift and blind the M elements in $X_P$ 404. The shifted and blinded encrypted $X_P$ is then sent to A 406, who can decrypt and unpack each of the blinded elements 408, to form the vector $\{X_I^A\}_{I=0}^{M-1}$. Then, both A and B apply a given quantizer to the components of their respective vectors $\{X_I^A\}_{I=0}^{M-1}$ and $\{X_I^B\}_{I=0}^{M-1}$ 410. A encrypts the quantized components of the vector $\{X_I^A\}_{I=0}^{M-1}$ 412, and sends them encrypted to B 414, that can use them for homomorphically unblind each of the quantized components of the vector $\{X_I^B\}_{I=0}^{M-1}$ 416, obtaining the encrypted quantized unpacked version of each of the elements $\{X_I\}_{I=0}^{M-1}$.

In a particular embodiment, an apparatus for secure iterative processing of encrypted signals is disclosed. Such apparatus comprises (a) a hardware processor configured for 1) implementing a secure iterative processing protocol that avoids cipher blowup; and 2) applying an iterative algorithm directly on said encrypted signals to generated an encrypted processed output signal; and (b) a output interface for outputting said encrypted processed output signal. The hardware processor can be any hardware capable of processing including processors, microprocessors, digital computers, microcomputers, Application Specific Integrated Circuits (ASICs), Integrated Circuit, Field Programmable Gate Arrays (FPGAs), etc. The output interface can be any hardware capable of outputting the results including any time of display terminal, monitors, mobile devices, printers, etc.

Framework

The most efficient SPED primitives are those that exploit the properties of homomorphic encryption for performing some linear fixed operations, but most of the times signal processing solutions need to go further, resorting to adaptive filtering algorithms, due to their greater flexibility, higher responsiveness when tracking the changes in the environment, their convergence to the optimal fixed solution when working in a stationary environment, and the fact that they are the optimal solution in settings where the information about the signal characteristics is not complete, offering a much better performance than fixed filters. Hence, a considerable number of practical signal processing applications make use of adaptive filters. As demonstrated in this disclosure, the current homomorphic cryptosystems cannot directly deal with adaptive filters due to cipher blowup after a given number of iterations; on the other hand, full homomorphisms able of executing any circuit without the need of decryption, are still not practical, due to the huge size needed for the ciphertexts. In fact, the existence of practical fully homomorphic cryptosystems is still an open problem. Even though there are some linear transforms and basic operations that can be directly translated into homomorphic processing, the set is too limited, and when privacy is a concern, the solution cannot impose that these operations be replaced by simpler non-adaptive algorithms, as the negative impact on performance could virtually destroy the usefulness of the algorithm. This is especially true when the involved signals are not stationary, and the filter must track their changes over time.

This disclosure presents several secure solutions for privacy-preserving adaptive filtering that involve homomorphic processing, garbled circuits and interactive protocols, in order to overcome the limitations of the three technologies, while profiting from their respective advantages. We take the LMS algorithm as a prototypical example of a powerful and versatile adaptive filter, and compare the privacy solutions for the execution of the algorithm in terms of computation and communication complexity. Furthermore, we also perform a comparison in terms of the effect of fixed-point arithmetic on the error that the algorithm produces. We show the trade-off that the combination of these different technologies establishes between precision, computational load and required bandwidth, and we look for the optimum configuration by proposing novel interactive protocols aimed at efficiently solving the cipher blowup problem, coming to several solutions that reach an optimum balance among the involved performance figures.

Notation

In this disclosure we will use indistinctly lowercase letters to represent classes in a ring ($\mathbb{Z}_n$, +, .) and a representative of that class in the interval [0, n). $\lceil . \rceil$ will represent the rounding function of a number to the nearest integer. The used vectors will be represented by lower-case boldface letters, whereas matrices will be represented by upper-case boldface letters. The encryption of a number x will be represented by [[x]], and the vector (matrix) formed by the encryptions of the vector x (matrix X) will be represented by [[x]] ([[X]]). When working with the binary representation of a number x, the encryption of the vector of binary bits of that representation will be denoted as $[[x]]_b$.

The operations performed between encrypted and clear numbers will be indicated as if they were performed in the clear; e.g. [[X]]·b will represent the encryption of [[X·b]]. Regarding the complexity calculations, the communication complexity of each protocol will be denoted by $C_{cm}$, and it will be measured in bits.

Iterative Algorithms for Adaptive Filters

Stochastic Gradient Algorithms are characterized by the use of a non-deterministic estimate of the gradient, opposed to other gradient descent methods. The Least Mean Squares (LMS) algorithm is the most characteristic algorithm of this family, for being a efficient yet powerful and widely used adaptive filtering algorithm. It comprises two processes that jointly form a feedback loop: 1) a transversal filter $w_n$ with $N_E$ coefficients applied to the input sequence $u_n$, and 2) an update process of the coefficients of the transversal filter, based on the instantaneous estimation error $e_n$ between the output of the filter $y_n$ and a desired response $d_n$. For real signals, these two processes are expressed as $$y_n = w_n^T u_n \quad (1)$$

$$w_{n+1} = w_n + \mu u_n \underbrace{(d_n - y_n)}_{e_n}, \quad (2)$$

where $\mu$ is the step size and $.^T$ denotes transpose.

One of the variants of the LMS algorithm that does not update the filter coefficients after each output sample, but after a block of $N_b$ samples, is known as Block LMS. It has the advantage of being computationally more efficient and allowing parallel implementations, at the price of a slightly higher error excess. The update equations of this algorithm are the following $$y_n = \chi_n w_n \quad (3)$$

$$w_{n+1} = w_n + \underbrace{\frac{2\mu'}{L}}_{\mu} \phi_n, \quad (4)$$

where $\chi_n$ is an $N_b \times N_E$ matrix in which the ith row is the vector $u_{n \cdot N_b+i}^T = [u_n N_b+i, \ u_n N_b+i-1, \ \ldots \ u_n N_b+i-N_E+1]$, and $\phi_n = \chi_n^T e_n$ is the vector representing the opposite of the scaled averaged estimate of the error gradient for the $N_b$ samples of the nth block (the scale constant is already embedded into $\mu$). Furthermore, for the same convergence speed, the BLMS algorithm presents, in some cases, better numerical accuracy than the standard LMS.

There are many other variants of the LMS algorithm, but we will constrain our analysis and designs to only these two forms as representative embodiments. Those of ordinary skill in the art, after learning the teaching of this disclosure will find straightforward to apply the techniques to any other adaptive filter comprised of the same operations. In particular, for more complex adaptive algorithms, the difficulties of a privacy-preserving implementation are essentially those derived from the cipher blowup problem and, additionally, those derived from the implementation of nonlinear functions. Hence, the chosen forms of LMS are representative embodiments for those of ordinary skill in the art, as they hold the essential characteristics of adaptive filtering, and at the same time they are practical developments widely used in a vast number of applications, in the context of a privacy-aware scenario.

Privacy Scenario and Trust Model

According to one particular embodiment, we will consider two parties, A and B, both using an additively homomorphic cryptosystem in an asymmetric scenario, where B can only encrypt, but A possesses also the decryption key, and can perform both encryption and decryption.

For the problem of private filtering, the studied scenario represents a problem of private data processing, in which one party possesses the input signal and other party possesses the reference signal or the system model for driving the filtering of the input signal.

Hence, we will assume that one party B has clear-text access to the to-be-filtered sequence $u_n$, while the other party A will provide the desired sequence $d_n$; both parties' inputs must be concealed from each other. The system parameters can be known by both parties or be provided by one party; in our case, we assume that the update step p is agreed by both parties. The output of the algorithm (the filtered signal) is provided in encrypted form, in order to be input to a subsequent private protocol.

Regarding the privacy requirements, we will assume that both parties are semi-honest, in the sense that they will adhere to the established protocol, but they can be curious about the information they can get from the interaction. In this scenario, our protocols can be proven private (as shown in this disclosure); informally, both parties A and B can only get the information given by the disclosed output of the system, and no information is leaked from the intermediate steps of the protocols.

Secure Computation

In this subsection we provide definitions and introduce homomorphic encryption, secret sharing, and secure multiparty computation, which are needed in the development of the constructions disclosed herein.

Homomorphic Encryption

Some cryptosystems present homomorphisms [12] between the groups of clear-text and cipher-text, that allow for the execution of a given operation directly on encrypted values, without the need of decryption. Examples of homomorphic cryptosystems are Rivest, Shamir and Adleman (RSA), with a multiplicative homomorphism, or Paillier [13] and its variants, with an additive homomorphism.

In this disclosure, we do not restrict the used cryptosystem for the presented protocols, as long as it presents an additive homomorphism. There are many semantically secure cryptosystems with this property, like Paillier [13] or Damgård, Geisler and Krøigaard (DGK) [14], but for the sake of clarification, and for performing the numerical calculations, we have chosen the extension of Paillier encryption given by Damgård and Jurik [15], due to its good trade-off between efficiency, encryption size and cipher expansion.

Damgård and Jurik's cryptosystem presents an additive homomorphism that allows computing the addition of two encrypted numbers and the product of an encrypted number and a known integer:

$$[[x+y]] = E_{DJ}[x+y] = E_{DJ}[x] \cdot E_{DJ}[y] \mod n^{s+1},$$
$$[[x \cdot k]] = E_{DJ}[x \cdot k] = E_{DJ}[x]^k \mod n^{s+1}. \quad (5)$$

The message space is $\mathbb{Z}_{n^s}$, where n is the product of two safe primes p, q, and the parameter $s \in \mathbb{Z}^+$ is fixed.

The encryption of a message x is obtained by picking a random $r \in \mathbb{Z}_{n^{s+1}}^*$, and computing the ciphertext $E_{DJ}[x]$ as $E_{DJ}[x] = g^x r^{n^s} \mod n^{s+1}$.

We must also draw attention to the fact that currently there is no practical fully homomorphic cryptosystem; i.e., there is no secure cryptosystem that allows for the homomorphic computation of additions and products without restrictions. There have been recent contributions by Gentry [3], that presents a cryptosystem based on ideal lattices with bootstrappable decryption, and shows that it achieves a full homomorphism. Nevertheless, the author argues that making the scheme practical remains an open problem. There is a research line currently underway, with works like [16], focused on translating Gentry's scheme into a practical fully homomorphic solution, but it is still limited to very small plaintexts and very simple circuits. By now, we will adhere to using an additively homomorphic cryptosystem, always taking into account the advantages that an efficient and practical fully homomorphic cryptosystem would provide.

Secret Sharing

Secret sharing is a technique introduced by Adi Shamir [17], by which a given value (the secret) is divided among several parties, such that the cooperation among a number of these parties is needed to recover the secret. None of the parties alone can have access to the secret.

Shamir's scheme is based on polynomials, and the need of k points to completely determine a degree (k−1) polynomial. Secret sharing is a widely used primitive in cryptographic protocols. In this work we present embodiment, and without limitation on two-party protocols; thus, we are only interested in the two-party version of the secret sharing scheme, that is based on linear functions and, consequently, naturally supports the computation of sums and products directly on the shares: let $\mathbb{Z}_n$ be the domain of the secrets. Then, a share of a secret x is defined as two values $x_A$ and $x_B$, owned by their respective parties, such that $x_A + x_B \equiv x \mod n$. Hereinafter, randomizing an encrypted value x will mean obtaining one share and providing the encryption of the other (through homomorphic addition).

Secure Multiparty Computation

Secure Two-Party Computation was born in 1982 with Yao's Millionaires' problem [1], and later generalized to Multiparty Computation by Goldreich et al [2]. Yao proposed a solution to the binary comparison of two quantities in possession of their respective owners, who are not willing to disclose to the other party the exact quantity they own. The solution that Yao proposed was based on "garbled circuits," in which both parties evaluate a given circuit, gate by gate, without knowing the output of each gate. Yao's solution was not efficient, and later, many protocols based on other principles like homomorphic computation or secret sharing were proposed in order to efficiently perform other operations in a secure manner.

Nevertheless, while homomorphic computation and secret sharing are very efficient for implementing arithmetic operations, circuit evaluation is still more efficient when dealing with binary tests [18]. Thus, there exist efficient protocols for binary comparison [18, 19] or Prefix-OR [18] that will be needed, with some modifications, for the implementation of the embodiments presented in this disclosure. Traditionally, the search for efficient solutions has led to proposals for changing between integer and binary representations in order to efficiently implement both arithmetic and binary operations; e.g., there are solutions like the BITREP protocol [20], that converts Paillier encrypted integers to Paillier encryptions of their corresponding bit representation.

Proposed Protocols & Detailed Description According to Particular Embodiments

In this section, we present different embodiments in order to tackle the private implementation of the LMS algorithm and similar adaptive filters, and to overcome the limitations that the sole application of current homomorphic encryption and garbled circuits has in the context of secure adaptive filtering.

Homomorphic Processing

The LMS algorithm, and most of the adaptive filters currently in use, while having an essentially non-linear behavior due to their adaptive nature, comprise only linear operations. Thus, it is foreseeable that homomorphic processing can yield a quite efficient solution. Unfortunately, there are two drawbacks in following this approach:

There are no practical fully homomorphic cryptosystems; the most promising contribution in this sense is Gentry's poly-time and poly-space fully homomorphic cryptosystem, whose constant factors make it impractical [3]; hence, using only homomorphic processing implies resorting to interactive protocols for performing multiplications between encrypted values, or for any other more complex operation.

The inputs to the secure protocol must be quantized prior to encryption. Hence, it is necessary to work in fixed point arithmetic, keeping a scale factor that affects all the values under encryption. This factor will increase with each encrypted multiplication, limiting the number of allowed iterations of the adaptive algorithm, until the encrypted numbers cannot fit the cipher, when it is said that the cipher blows up.

There are two approaches for devising a private LMS protocol, depending on whether the output is either disclosed or given in encrypted form. The simplest approach is the one in which the output of the LMS algorithm can be disclosed to both parties; in this case, a secure protocol could be quite efficient, as the problem of the increased scale factor can be easily solved by requantizing the outputs in the clear after every iteration with no additional overhead, requiring only homomorphic additions and multiplications and interactive multiplication gates. Nevertheless, besides its simplicity, this particular embodiment has the consequence that disclosing the output gives both parties all the necessary information for retrieving the other party's private input.

The private output embodiment is has higher practical significance, and it is the one on which we will focus in this disclosure, as it corresponds to the case where the LMS block can be used as a module of a more complex system whose intermediate signals must not be disclosed to any party. We will adhere from now on to this scenario, and we will begin by presenting a protocol that uses only homomorphic computations (TABLE 1-Algorithm 1), in order to have a complexity reference. In Algorithm 1, interactive multiplication protocols are avoided due to the division of the roles of both parties: the party that provides the private input u, without decryption capabilities, is the one that will perform the homomorphic operations between the encrypted intermediate values and u. In this case, there is a constant scaling factor (updateFactor) that is accumulated after every iteration, and that forces to scale the inputs and the intermediate results in order to have the correct output. This accumulated factor limits the maximum number of iterations that the protocol will be able to execute before the cipher blows up:

$$N_{max\ iter} = \left\lfloor \frac{n_{cipher}}{n_x + \log_2(updateFactor)} \right\rfloor, \quad (6)$$

where $n_x$ bits are used for representing each input, and $n_{cipher}$ is the bit size of the maximum representable number inside the cipher.

adaptive filtering. For typical values of the used precision (48-bit numbers, 24 bits for the fractional part) and medium-term security (2048 bits for Paillier modulus), this protocol is limited to approximately 17 iterations, which may be insufficient for reaching the steady-state regime, and prevents its use in certain practical applications. Therefore, we present it as a reference that sets the minimum of computation and communication complexity that can be achieved for a private LMS. It must be noted that this iteration limit could be improved through the use of a different encoding of the inputs, like the logarithmic encoding presented in [21], but such approach comes at the price of an increased communication and computation complexity even for additions and multiplications.

In the following subsections, we propose several novel alternative embodiments and extensions, through the combination of other privacy-preserving techniques, aimed at overcoming the cipher blowup problem with the minimum overhead in communication and computation complexity, while preserving an acceptable excess error with respect to the infinite precision non-private LMS algorithm.

Security

Regarding the security of this protocol and the ones presented in the following sections, it can be

ALGORITHM 1 TABLE 1

Homomorphic Processing (HP) PrivateLMS Protocol

Inputs: A: $d_n$, $w_0$; B: $u_n$, $w_0$

Outputs: $[[y_n]]$.

| A | B |
|---|---|
| Initialize carriedFactor = $2^{n_f}$, updateFactor = $2^{3n_f}$. | |
| Encrypt inputs and send $[[d_n]]$ to B. | |
| for k = 1 to $N_{iter}$ | |
| | Perform the vector multiplication $[[y_k]] = [[w_k]] \cdot u_k$. |
| | Scale $[[d_k']] = [[d_k]] \cdot $carriedFactor. |
| | Obtain $[[e_k']] = \mu \cdot ([[d_k']] - [[y_k]])$. |
| | Perform the scalar multiplication $[[\Delta w_k]] = [[e_k']] \cdot u_k$. |
| | Update the coefficients vector $[[w_{k+1}]] =$ |
| | $[[w_k]] \cdot $updateFactor $+ [[\Delta w_k]]$. |
| Update carriedFactor = carriedFactor · updateFactor. | |
| | Output $[[y_k]]$. |
| endfor | |

The communication complexity of this protocol, assuming Damgård-Jurik encryptions, is $$C_{HPcm} = (2N_{iter} + N_E - 1)|E|, \quad (7)$$

where $N_{iter}$ is the number of performed iterations, $N_E$ is the length of the filter and $|E|$ represents the number of bits of an encryption.

It is important to note that the iteration limit imposed by this protocol, due to cipher blowup, can be a drawback in certain scenarios and could impede the use of only homomorphic processing (in its current development stage) to perform proven, using a simulator argument, that all of them are statistically secure under the random oracle model, assuming semi-honest parties. Due to the use of sequentially composed secure subblocks and the semantic security of the underlying cryptosystems, the views that each party gets are statistically indistinguishable from a random sequence, and the parties cannot derive from those views any extra information about the private inputs of the other party.

Garbled Circuits Implementation

This protocol represents the whole LMS algorithm as a binary circuit, in which we include a rounding operation in each multiplication circuit in order to preserve a constant bit-size for the handled numbers. The protocol is sketched as TABLE 2 (Algorithm 2). It is straightforward to derive the binary circuit implementing Eqs. (1) and (2), so we do not detail its construction in Algorithm 2; as for the garbled implementation, we use the exclusive-OR (XOR)-free version of [22], with the efficient extensions for the Oblivious Transfer (OT) protocol of [23], and an Elliptic Curve version of ElGamal [24, 25] for the encryptions. This implementation uses fixed precision, and rounds the numbers after every multiplication in order to preserve this precision. Hence, it overcomes the quantization problems that the previous one presents, but it requires working at a bit level, thus being its performance highly dependent on the bit-size of the represented numbers.

Additionally, every transferred bit must be independently encrypted, which also multiplies the communication complexity of the whole protocol by a large factor, resulting in $$C_{GCcm} = |E|(4n_x^2(N_{iter} + 2N_E N_{iter}) + 2n_x(-1 + 10N_{iter} + 4N_{iter}n_f + 2N_E(1 + 5N_{iter} + 4N_{iter}n_f)) - 4N_{iter}(5 + n_f(3 + n_f) + N_E(7 + 2n_f(3 + n_f)))), \quad (8)$$

where $N_E$ is the length of the filter, $|E|$ represents the number of bits of an EC-ElGamal encryption, $n_x$ is the total number of bits for representing each number, and $n_f$ is the number of bits used for the fractional part.

The complexity has, as expected, a linear dependence on the product of the number of iterations and the size of the filter, while it has a quadratic dependence on the bit-size of the used numbers and the bit-size of the fractional part, due to the presence of multiplication circuits. The communication complexity is much higher than in Algorithm 1, due to the need of communicating the whole garbled circuit prior to its execution.

A remark worth noting on Algorithm 2 is that inputs get to the circuit once per iteration, even when they could be joined all together (in long enough blocks) and apply OT reduction techniques [23] for lowering the computational complexity of the whole protocol. The reason behind this structure is that we are assuming that the system must work with some real time constraints, and offer the outputs at the same rate as the input, without a significant delay. Hence, the inputs might be packed together for reducing the computation overhead of the OTs in small blocks, whenever the delay is affordable; it must be noted that the communication overhead is not reduced though: the reduction techniques in [23] replace public key encryptions with computationally lighter hash functions; since we are using elliptic curves for the public key encryption, their size is comparable to that of a collision resistant hash for the same security level.

Hybrid Implementation

In order to overcome the quantization problem in Algorithm 1 and lower the communication complexity of Algorithm 2, we have developed a hybrid algorithm (Algorithm 3) that uses homomorphic processing for the bulk of the algorithm, and a quantization circuit to avoid carrying

ALGORITHM 2 TABLE 2

Garbled Circuit (GC) PrivateLMS Protocol

Inputs: A: $d_n, w_0$; B: $u_n, w_0$.

Outputs: $[[y_n]]_b$.

| A | B |
|---|---|
| Obtain the bit representation of their respective inputs. Execute generateGC( ) for the first $m \leq N_{iter}$ iterations, and send the garbled circuit and the keys corresponding to her inputs to B; the garbled gates for the remaining iterations can be generated and sent in parallel with the execution of the previous ones. for k = 1 to $N_{iter}$ Perform parallel OT protocols so that B get the input keys to initialize the circuit corresponding to the $k^{th}$ iteration. | |
| | Execute the circuit, using the received input keys from A. Output $[[y_k]]_b$. |
| endfor | | factors. Conversion protocols from homomorphic encryption to binary representation and vice-versa are used to connect both parts of the protocol.

There are several possible combinations of homomorphic processing and garbled circuits that yield different results in the complexity balance. We can argue that the optimal point for applying quantization in terms of efficiency is at every iteration, when the scaled output of the filter $y'_k$ is obtained (cf. TABLE 3-Algorithm 3), using a quantization step of $2^{3n_f}$ to recover the initial precision of $n_f$ fractional bits. When this In this case, the quantization step used for the filter coefficients is not the same as the one used for the input/output values: filter coefficients are quantized with a finer step, using $3 \cdot n_f$ bits for their fractional part, instead of $n_f$. This is needed in order to keep the bit-size of the outputs constant and avoid any further quantization operations. Furthermore, as stated the quantization step of the filter coefficients is the one that has the highest impact on the quantization error that is propagated to the outputs, so this measure will make this method have a much better behavior than Algorithm 2 in terms of mean square error (MSE).

TABLE 3

Algorithm 3
Hybrid (Hy) PrivateLMS Protocol

Inputs: A: $d_n$, $\omega_0$; B: $u_n$, $\omega_0$.
Outputs: $[[y_n]]$.

| A | B |
|---|---|
| Encrypt her inputs. Execute generateGC() for the rescaling circuit in each of the first m ≤ $N_{iter}$ iterations, and send the garbled circuit to B; the remaining circuits can be generated and sent during the execution of the previous ones. for k = 1 to $N_{iter}$ | |
| | Perform the vector multiplication $[[y'_k]] = [[w_k]] \cdot u_k$. |
| Convert $[[y'_k]]$ to its bit-representation using the bit conversion protocol. Perform parallel OT protocols so that B get the input keys to initialize the circuit corresponding to the $k^{th}$ iteration. | |
| | Execute the rescaling circuit $$[[y_k]]_b = \left[\left[\left\lfloor \frac{y'_k}{2^{3 \cdot n_f}} \right\rfloor\right]\right]_b,$$ using the received input keys from A. |
| The shared output of the circuit $[[y_k]]_b$ is converted back to a homomorphic encryption $[[y_k]]$. | |
| | Obtain $[[e_k]] = \mu \cdot ([[d_k]] - [[y_k]])$. Perform the scalar multiplication $[[\Delta w_k]] = [[e'_k]] \cdot u_k$. Update the coefficients vector $[[w_{k+1}]] = [[w_k]] + [[\Delta w_k]]$. Output $[[y_k]]$. |
| end for | | strategy is chosen, only one scalar value is input to the quantization circuit at every iteration, which means reaching the minimum of communication complexity for the used garbled circuit. Furthermore, this quantization allows to keep a constant scaling factor for the rest of the handled values, avoiding the rescaling operation that is performed in Algorithm 1 for every input value and for the filter coefficients; hence, the computation complexity also reaches its minimum with this strategy. Lastly, the bounded size of the represented values makes possible the use of a packing strategy for the homomorphic processing, such that more than one input value can be packed into the same encryption.

The communication complexity of the protocol is $$C_{Hycm} = (2N_{iter} + N_E - 1)|E_H| + N_{iter}|E_C|(19n_x + 7n_{sec} + 24n_f), \quad (9)$$

where $N_E$ is the length of the filter, $|E_H|$ and $|E_C|$ represent the bit-size of a homomorphic and a garbled encryption respectively, $n_x$ is the total number of bits for representing each number, $n_f$ is the number of bits used for the fractional part, and $n_{sec}$ is the number of security bits used for the conversion protocols. As the circuit part involves only rounding operations, and the multiplications are performed homomorphically, the complexity is linear on the bit-length of the inputs and the number of iterations, instead of quadratic, as in the garbled-circuit solution.

Hybrid Block Protocol and Packing Strategy

As pointed out in the preceding section, the hybrid implementation of the algorithm has the advantage of working always with bounded numbers, and it allows for a parallel block implementation in the form of packed coefficients within a cipher.

Typically, the numbers involved in signal processing calculations can be bounded, and their bit-size represents just a very small fraction of the size of a secure cipher modulus; the extra bit size is unused, but it is necessary due to security constraints on the cryptosystem. Nevertheless, this space can be utilized; assuming that every involved calculation result x is bounded at the moment of unpacking such that it occupies at most $n_b$ bits (i.e., $|x| \leq 2^{n_b - 1}$; for the hybrid protocol, $n_b = n_x + 3 \cdot n_f$), every K inputs $\{x\}_{i=0}^{K-1}$, with $$K \leq \left\lfloor \frac{n_{cipher} - n_{sec}}{n_b} \right\rfloor$$

(being $n_{sec}$ the number of security bits needed for the conversion protocol), can be packed in only one encryption as $$[[x_{packed}]] = \left[\left[\sum_{m=0}^{K-1}(x_m + 2^{n_b - 1}) \cdot 2^{m \cdot n_b}\right]\right],$$

being $2^{n_b - 1}$ a shift factor for considering only positive numbers. Note that the shift factor fixes the sign convention between the bit representation ($-a \equiv 2^{n_b}-a$) and the modular arithmetic ($-a \equiv n-a$), working always in the range $[0, 2^{n_b})$, and avoiding errors in the conversion between both representations. Hence, it is not an integral part of the packed formulation, and shall only be applied before a conversion protocol. This packing allows for the computation of vector products and additions with a reduced complexity (it gets divided by the number of packed elements), taking advantage of the unused huge space that the cipher allows.

This strategy was later generalized to an arbitrary base in [5], but due to the use of binary circuits, $2^{n_b}$ is the most $$w_{n+1} = w_n + \mu \sum_{i=1}^{N_b-1} u_{n \cdot N_b + i} \cdot e_{n \cdot N_b + i}, \quad (10)$$

where $N_b$ represents the size of the block. The usual choice of $N_b$ for the Block LMS filter is $N_b = N_E$, as it yields the minimum computational complexity.

Since the packing factors $2^{n_b}$ are chosen to be powers of two, the bit-conversion protocol automatically unpacks the numbers without any extra complexity, and the conversion to homomorphic encryption after the circuit evaluation is performed for each unpacked number in parallel.

TABLE 4

Algorithm 4 Hybrid Block (HB) PrivateLMS Protocol
Inputs: A: $d_n$, $w_0$; B: $u_n$, $w_0$.
Outputs: $[[y_n]]$.

| A | B |
|---|---|
| Encrypt her inputs. A executes generateGC() for the unpacking, parallel rescaling and output circuits in each of the first m ≤ $N_{iter}$ iterations, and sends these garbled circuits to B; the circuits for the remaining iterations can be generated and sent during the execution of the previous ones. for k = 1 to $\lceil N_{iter}/N_b \rceil$ | Pack the input vector as $X_j^{(k)} = \sum_{i=0}^{N_b-1} 2^{n_x + 3n_f} \cdot u_{k \cdot N_b + i - j}$, $j = \{0, \ldots, N_E - 1\}$. Perform the packed vector multiplication $[[y_K]] = [[w_k]] \cdot X^{(k)}$. |
| Convert $[[y_k]]$ to its unpacked bit-representation using the bit conversion protocol. Perform parallel OT protocols so that B get the input keys to initialize the circuit corresponding to the $k^{th}$ iteration. | Execute the unpacking and parallel rescaling circuit, using the received input keys from A. |
| The output of the circuit $[[y_{k \cdot N_b + i}]]_b$, $i = \{0, \ldots, N_b - 1\}$ $[[y_{k \cdot N_b + i}]]_b$, $i = \{0, \ldots, N_b - 1\}$. | is converted back to a homomorphic encryption Obtain $[[e_{k \cdot N_b + i}']] = \mu \cdot ([d_{k \cdot N_b + i}]] - [[y_{k \cdot N_b + i}]])$, $i = \{0, \ldots, N_b - 1\}$. |
| Perform the scalar multiplication | $[[\Delta w_k]] = \sum_{i=k \cdot N_b}^{(k+1) \cdot N_b - 1} [[e_i]] \cdot u_{i - N_E + 1}$. Update the coefficients vector $[[w_{k+1}]] = [[w_k]] + [[\Delta w_k]]$. Output $[[y_{k \cdot N_b + i}]]$, $i = \{0, \ldots, N_b - 1\}$.' |
| endfor | | efficient choice, as divisions and multiplications by this factor in the circuit are just implemented for free as bit-shifts in the clear.

While the packing operation improves the efficiency of the homomorphic computations, on the garbled circuit side of the protocol, it has the effect of increasing the size of the used circuits, multiplying it by the number of values packed into the same encryption. Thus, the complexity of the executed garbled circuits is preserved after packing (lowered if OT reduction techniques are used for each packed block), while the conversion protocols also get an increase in performance, as only one conversion is needed for each encryption containing several packed numbers.

Turning to the secure hybrid block protocol, the packed elements must be processed all together, applying the same coefficients to all of them. Hence, the normal LMS algorithm cannot take advantage of packing, as the filter is kept constant for each group of packed samples, and the update equation has to be slightly modified in order to account for the average error of the whole set of packed samples instead of the error of individual samples; this filter is known as the Block LMS algorithm [26], in which the update equation is The communication complexity of the hybrid block protocol, taking into account that the XOR gates are free of communication for the used implementation, is exactly the same as for the hybrid protocol:

$$C_{HBcm} = (N_E - 1 + 3N_{iter} + 5N_E N_{iter})|E_H| + N_{iter}|E_C|(19n_x + 7n_{sec} + 24n_f). \quad (11)$$

This complexity is linear in the number of iterations, the size of the filter and the bit size of the numbers, and it is independent of the number of packed coefficients.

Fast Implementation

The hybrid block protocol is far more efficient than the one based solely on garbled circuits. Nevertheless, the conversion protocols introduce an overhead, and the fact that the input values to the rounding garbled circuits are generated on the fly prevents much of the preprocessing that garbled circuits would need to compensate the complexity of the oblivious transfers. The gap in computational complexity with respect to the solution based on homomorphic processing is too big, especially when using a high precision bit representation. Thus, we have come to a much more efficient solution that, in order to tighten that gap, avoids the use of circuits, and substitutes them by an approximate rounding protocol with statistical security. The block implementation can also profit from the use of this solution, with a decrease on the maximum packing efficiency, as now the number of packed coefficients is bounded by $$N_b^{(FB)} \le \left\lfloor \frac{n_{cipher}}{n_b + n_{sec}} \right\rfloor, N_b^{(HB)} \le \left\lfloor \frac{n_{cipher} - n_{sec}}{n_b} \right\rfloor,$$

where $n_b = n_x + 3n_f$ is the maximum number of bits that a coefficient can occupy, and $n_{sec}$ is the number of security bits required for the protocol. In this case, the approximate rounding protocol also performs the unpacking of the results; it is described in its complete form in the next subsection. The implementation of this fast protocol replicates exactly the implementation of the hybrid protocols, without the generation and use of the garbled circuits, substituted by the much more efficient approximate rounding protocol; thus, for the sake of brevity, we omit its sketch. The disadvantage is that the rounding error rises with this protocol; however, it is compensated by a reduction of the complexity gap with respect to the solely homomorphic solution.

The communication complexity of the fast implementation, in normal and block forms respectively, is $$C_{FPcm} = (4N_{iter} + N_E - 1)|E_H|, \quad (12)$$

$$C_{FBcm} = \left(\left(3 + \frac{1}{N_b}\right)N_{iter} + N_E - 1\right)|E_H|,$$

where $N_b$ is the number of packed coefficients for the block protocol. This complexity is of the same order as that of the protocol that uses only homomorphic processing.

Approximate Rounding and Unpacking Protocol

We have developed several protocols for quantization under encryption. In this disclosure, we present two versions of them, with unconditional blinding of the used values; one is an exact protocol that produces the same results as the clear-text quantization, and the other is an approximate faster version; both use comparison circuits for performing the quantization operation. We sketch at Algorithm 5 a third version of the secure quantization protocol where a statistical blinding is used instead of an unconditional one, avoiding the need for comparison circuits. The security of the algorithm is controlled by the parameter $n_{sec}$, chosen such that $2^{-n_{sec}}$ is negligible; then, the distribution of the blinded values is indistinguishable from a random sequence (a distinguisher will succeed with probability $2^{-n_{sec}}$); hence, due to the sequential composition of statistically secure protocols and the semantic security of the encryption system, the protocol can be proven statistically secure under the random oracle model using a simulator argument.

It can be seen that the rounding error that it introduces is higher than that of a linear quantizer, and it is not uniform between $$\left[-\frac{1}{2}, \frac{1}{2}\right),$$

but triangular between [−1, 1), thus duplicating the quantization MSE.

The communication complexity of the protocol is $$C_{RPcm} = (N_b + 1)|E_H|, \quad (13)$$

where $N_b$ is the number of packed elements in one cipher, and $|E_H|$ is the bit size of a homomorphic encryption. Due to the great benefit in efficiency with respect to the impact on accuracy, this is the chosen protocol for the fast implementation of the private LMS algorithm.

We must point out that this solution to the cipher blowup problem represents the minimum increase in computation and communication complexity with respect to plain homomorphic processing. We have discarded the possibility of using a different number encoding due to the following reasoning: our approximate rounding protocol is approximately equivalent to a secure multiplication protocol in terms of bandwidth and total computation (at most, one per iteration in the implementation of the whole LMS); using a different encoding like the one in [21], would introduce the overhead of working with triplets of encryptions for each number, adding two multiplication protocols per encrypted multiplication, and twelve multiplication protocols and two comparison protocols per encrypted addition; hence, our solution is notably more efficient.

TABLE 5

Algorithm 5 - Approximate Rounding and unpacking Protocol
Inputs: A: Quantization step $\Delta = 2^l$ and a security parameter $n_{sec}$;

B: $[\![x_{pack}]\!] = \left[\!\!\left[\sum_{i=0}^{N_b-1} x_i \cdot 2^{i \cdot (n_b + n_{sec} + 1)}\right]\!\!\right], \Delta = 2^l, n_{sec}$ Outputs: $\{[\![Q_\Delta'(x_i)]\!]\}_{i=0}^{N_b-1}$.

| A | B |
|---|---|
| Decrypt and unpack the received encryptions, obtaining $\{x_i^{(a)}\}_{i=0}^{N_b-1}$. | Generate $x_i^{(b)} \in_R \{2^{n_b-1}, \ldots, 2^{n_b-1} + 2^{n_b+n_{sec}}\}$, $i = \{0, \ldots, N_b - 1\}$, with which he shifts and additively blinds the packed encryptions: $[\![x_p^{(a)}]\!] = [\![x_{pack}]\!] + \left[\!\!\left[\sum_{i=0}^{N_b-1} x_i^{(b)} \cdot 2^{i \cdot (n_b + n_{sec} + 1)}\right]\!\!\right]$, homomorphically. Send $[\![x_p^{(a)}]\!]$ to A. |
| Apply a linear quantizer with step $\Delta = 2^l$ to their clear-text vectors component-wise, obtaining $\{Q_\Delta(x_i^{(a)})\}_{i=0}^{N_b-1}$ and $\{Q_\Delta(x_i^{(b)})\}_{i=0}^{N_b-1}$, respectively. | |
| Encrypt her quantized vector component-wise, and send the encryptions back to B. | Unblind the quantized encrypted values obtained from A, obtaining the encrypted quantizations of the original values $\{[\![Q_\Delta'(x_i)]\!]\}_{i=0}^{NH_b-1} = [\![Q_\Delta'(x_i^{(a)})]\!] - Q_\Delta(x_i^{(b)})\}_{i=0}^{N_b-1}$. |

Fast Encryption and Decryption for Damgård-Jurik Cryptosystem

Encryption and decryption are two of the most costly operations, due to the heavy modular exponentiations that they must perform. For our implementations, we have used a different version of the decryption operation, and for the private encryption of the Paillier cryptosystem (and the Damgård-Jurik extension) that enhance the performance of the original methods. This appendix describes both methods. Modular exponentiations are the most computationally demanding basic operations, whose complexity is linear in the exponent size $|e|$ and quadratic in the modulus size $|n|$ (i.e., $O(|e||n|(|n|-1))$). Thus, reducing the bit size of the involved operands yields important efficiency gains. The presented reductions are based on using the knowledge of the factorization of the public modulus n, enhancing all decryption operations and encryption operations performed by a party with decryption privileges (private encryption). Looking at the most common two-party scenarios of homomorphic encryption, the party that owns the data and owns the decryption keys is usually the client, that normally has a processing power lower than the server; hence, it makes sense to optimize the operations that this party must perform, and this is exactly what our modifications do.

Decryption

Let $L_a(b)$ be defined as $$L_a(b) = \frac{b-1}{a},$$

for $b \equiv 1 \bmod a$, $0 < b < a^2$, as in Paillier's work. In [15], it is suggested that the decryption operation, after the exponentiation $c^d \bmod n^{s+1}$, be divided into two parts, using $L'_p(c^d) = L_p(c^d) \cdot q^{-1}$ and $L'_q(c^d) = L_q(c^d) \cdot p^{-1}$ instead of $L_n(c^d)$, and then joined using the Chinese Remainder Theorem (CRT). While this strategy can provide a speed-up in the computations, as each part of the decryption works with half-sized numbers, the initial exponentiation is still the most costly operation. We next show how the knowledge of the factorization of n allows also for breaking up this exponentiation into two parts.

For a message x, its encryption $c = (1+n)^x r^{n^s} \bmod n^{s+1}$, can be reduced modulo $p^{s+1}$ and $q^{s+1}$, obtaining two partial encryptions with half the size of c: $c_p = (1+n)^x r^{n^s} \bmod p^{s+1}$ and $c_q = (1+n)^x r^{n^s} \bmod q^{s+1}$. By Carmichael's Theorem, the order of the units in the group $\mathbb{Z}_{p^{s+1}}$ (resp. $\mathbb{Z}_{q^{s+1}}$) is a divisor of $p^s(p-1)$ (resp. $q^s(q-1)$). Hence, the minimum exponent that cancels the effect of $r^{n^s}$ is $p-1$ (resp. $q-1$), that is $$L'_p(c_p^{p-1}) = L_p\left(((1+n)^x)^{p-1} r^{q^s \cdot p^s \cdot (p-1)}\right) \cdot q^{-1} \quad (14)$$

$$\equiv \left(1 + x(p-1)n + \binom{x(p-1)}{2}n^2 + \ldots + \binom{x(p-1)}{s}n^s\right)$$

$$\bmod p^s,$$

and analogously for q. Applying the decryption algorithm with p and q for both parts, and multiplying afterwards each of them by the inverses of $p-1$ and $q-1$, the desired result is obtained:

$$d_p = dec_{p^s}(c_p^{p-1}) \cdot (p-1)^{-1} \equiv x \bmod p^s, \quad d_q = dec_{q^s}(c_q^{q-1}) \cdot (q-1)^{-1} \equiv x \bmod q^s. \quad (15)$$

The application of the CRT yields that, if $a_p$ and $a_q$ are two integers such that $a_p \cdot p^s + a_q \cdot q^s = 1$, then $x \equiv d_p \cdot a_q \cdot q^s + d_q \cdot a_p \cdot p^s \bmod n^s$.

Finally, as the values of $(p-1)^{-1} \bmod p^s$, $(q-1)^{-1} \bmod q^s$, $a_q \cdot q^s \bmod n^s$ and $a_p \cdot p^s \bmod n$ can be precalculated, and the L' functions can be executed once for the highest power of p and q and subsequently modularized for the rest of the iterations of the algorithm (as $L_b(a \bmod b^{j+1}) \equiv L_b(a \bmod b^{s+j}) \bmod b^j$), neglecting the complexity of a modularization and the addition/subtraction of a unit, the total decryption complexity is reduced to $$2\left(X_{\frac{(s+1)|n|}{2},\frac{|n|}{2}} + D_{\frac{(s+1)|n|}{2}} + P_{s|n|} + \sum_{k=2}^{s}\left((k-1)\left(P_{\frac{k|n|}{2}} + A_{\frac{k|n|}{2}}\right)\right)\right) + A_{s|n|}, \quad (16)$$

where $X_{a,b}$ is the computational complexity of an exponentiation with modulus size a and exponent size b, $A_b$ and $P_b$ are the complexity of a modular addition and product with modulus size b respectively, and $D_a$ is the complexity of an integer division with dividend's size a. This results can be compared to the complexity of a regular decryption, performed as stated in [15], $$X_{(s+1)|n|,|n|} + D_{(s+1)|n|} + \sum_{k=2}^{s}((k-1)(P_{k|n|} + A_{k|n|})). \quad (17)$$

The reduction factor in complexity due to splitting the exponentiation is almost four.

Encryption

For regular encryption there is no additional gain to the one pointed out in Paillier's original work, by virtue of which taking $g = 1+n$ reduces the exponentiation $g^x \bmod n^2$ to a product $g^x \equiv (1+x \cdot n) \bmod n^2$, generalized in [15] to $n^{s+1}$ as a sum of s chained products; the exponentiation $r^{n^s}$ is, in principle, unavoidable. Nevertheless, when the encryption is performed by a party with decryption capabilities ("private" encryption), the knowledge of the private key allows for further improvements on efficiency, applying the same rationale as for fast decryption. In this case, the reduction seeks partitioning the exponentiation $r^{n^s}$ into two exponentiations with half-sized base and exponent. Given $a_{p^{s+1}}$ and $a_{q^{s+1}}$ such that $a_{p^{s+1}} \cdot p^{s+1} + a_{q^{s+1}} \cdot q^{s+1} = 1$, $r^{n^s} \bmod n^{s+1}$ can be calculated as $$r_p = r^{p^s(q^s \bmod (p-1))} \bmod q^{s+1}, \quad r_q = r^{q^s(p^s \bmod (q-1))} \bmod q^{s+1}, \quad r^{n^s} \equiv r_p \cdot a_{q^{s+1}} \cdot q^{s+1} + r_q \cdot a_{p^{s+1}} \cdot p^{s+1} \bmod n^{s+1}. \quad (18)$$

Precalculating the values of $a_{q^{s+1}} \cdot q^{s+1} \bmod n^{s+1}$ and $a_{p^{s+1}} \cdot p^{s+1} \bmod n^{s+1}$, the complexity of each encryption is reduced to $$2X_{\frac{(s+1)|n|}{2},\frac{(s+1)|n|}{2}} + 2(s+1)P_{(s+1)|n|} + 2s \cdot A_{(s+1)|n|}, \quad (19)$$

compared to $X_{(s+1)|n|,(s+1)|n|} + 2s \cdot P_{(s+1)|n|} + (2s-1)A_{(s+1)|n|}$ of a normal encryption, which yields a complexity reduction almost by a factor of four.

Cipher Renewal: Quantization Under Encryption

In order to renew the cipher and eliminate part of the excess of precision accumulated by the lack of a division operation, it is necessary to quantize the encrypted values. For this purpose, and to preserve perfect secrecy, we have developed interactive protocols of independent interest for performing quantization.

Let $[x] \in \mathbb{Z}_n$ be a class in $\mathbb{Z}_n$, and x its positive representative in the interval $x \in [0, n)$. A and B possess their respective shares $x_A$, $x_B$ of x (i.e. $x_A + x_B \equiv x \bmod n$). Both A and B want to requantize x with a step $\Delta \in (2, \lceil n/2 \rceil)$, with a maximum quantization error of $\Delta$. Let us assume that A knows the decryption key of an additive homomorphic cryptosystem, and both A and B can produce encryptions using this cryptosystem. The scenario can be plotted also with a threshold homomorphic cryptosystem, with straightforward modifications.

If B owns an encryption of [[x]], then he generates a random $x_B \in \mathbb{Z}_n$, blinds with it the encryption of [[x]], and sends the result [[x+$x_B$ mod n]] to A, who decrypts $x_A = x + x_B$ mod n. Then, both parties start with a share of x.

Each party quantizes his/her share $$x_{AQ} = \left\lceil \frac{x_A}{\Delta/2} \right\rceil, \quad x_{BQ} = \left\lceil \frac{x_B}{\Delta/2} \right\rceil;$$

with these values, both parties can obtain the bit representation of their respective quantities and run a binary comparison protocol (cf. [27])

$$x_{BQ} > \left\lceil \frac{n}{\Delta/2} \right\rceil - x_{AQ},$$

ending up with an encryption of the binary comparison.

Then, A can obtain $$[[Q_R(x)]] = [[x_{AQ}]] + [[x_{BQ}]] - \left\lceil \frac{n}{\Delta/2} \right\rceil \cdot \left[\!\left[ x_{BQ} \geq \left\lceil \frac{n}{\Delta/2} \right\rceil - x_{AQ} \right]\!\right].$$

We denote the result $Q_R(x)$ because it does not coincide exactly with the quantization $Q(x)$ when performed in the clear, because $Q_R(x)$ is quantized with a precision of $\Delta/2$, but the split in two shares introduces an error of $\pm 1$ in the quantization of x. Thus, even when the obtained precision is $\Delta$, the resulting encrypted number must be scaled by $\Delta/2$ after decryption in order to obtain the true quantized value.

The previous protocol could be thought of as a fast version of the quantization protocol, that has the drawback of introducing some noise due to the independent quantization of both shares. When the quantization must yield exactly the same results as in the clear, we can use an exact version of the previous protocol, that provides a perfect quantization, with the same result as if performed in the clear, at the cost of an increased computation and communication complexity. We now describe this exact solution.

After splitting x in two shares $x_A$ and $x_B$, each party quantizes his share with step $\Delta$, obtaining respectively $$x_{AQ} = \left\lceil \frac{x_A}{\Delta} \right\rceil,$$

$x_{Ar} = x_A$ mod $\Delta$, and $$x_{BQ} = \left\lceil \frac{x_B}{\Delta} \right\rceil,$$

$x_{Br} = x_B$ mod $\Delta$; both have the quantity $n_\Delta = n$ mod $\Delta$ in the clear. The quantization of x as a function of the previous four values can be expressed as $$[[Q(x)]] = [[x_{AQ}]] + [[x_{BQ}]] + \qquad (20)$$

$$\left(1 - 2\left[\!\left[ x_{Br} \geq \left\lceil \frac{\Delta}{2} \right\rceil \right]\!\right]\right) \cdot \left(1 - xor\left(\left[\!\left[ x_{Ar} \geq \left\lceil \frac{\Delta}{2} \right\rceil \right]\!\right], \left[\!\left[ x_{Br} \geq \left\lceil \frac{\Delta}{2} \right\rceil \right]\!\right]\right)\right) \cdot$$

$$\left(\left[\!\left[ x_{Ar} + x_{Br} \in \left[\left\lceil \frac{\Delta}{2} \right\rceil, \left\lceil \frac{3\Delta}{2} \right\rceil\right)\right]\!\right]\right) +$$

$$\left([[x_{Ar} + x_{Br} \in I_{n_\Delta}]] - \left[\!\left[ x_{Ar} + x_{Br} \in \left[\left\lceil \frac{\Delta}{2} \right\rceil, \left\lceil \frac{3\Delta}{2} \right\rceil\right)\right]\!\right]\right) \cdot$$

$$\left[\!\left[ x_{BQ} \geq \left\lceil \frac{n}{\Delta} \right\rceil - x_{AQ} \right]\!\right] - \left\lceil \frac{n}{\Delta} \right\rceil \cdot \left[\!\left[ x_{BQ} \geq \left\lceil \frac{n}{\Delta} \right\rceil - x_{AQ} \right]\!\right].$$

As the only needed binary operation is the exclusive-OR, for efficiency reasons we avoid the use of garbled circuits and implement it homomorphically as xor(a,b)=a+b−2a·b in $\mathbb{Z}_n$. The set $I_{n_\Delta}$ represents an interval reduced modulo $2\Delta$:

$$I_{n_\Delta} = \begin{cases} \left[\left\lceil \frac{3\Delta}{2} \right\rceil + n_\Delta, \left\lceil \frac{\Delta}{2} \right\rceil + n_\Delta\right)_{2\Delta}, & \text{if } n_\Delta \geq \left\lceil \frac{\Delta}{2} \right\rceil \\ \left[\left\lceil \frac{\Delta}{2} \right\rceil + n_\Delta, \left\lceil \frac{3\Delta}{2} \right\rceil + n_\Delta\right)_{2\Delta}, & \text{if } n_\Delta < \left\lceil \frac{\Delta}{2} \right\rceil, \end{cases} \qquad (21)$$

being $[,)_{2\Delta}$ the modular reduction of the interval with modulus $2\Delta$.

The binary comparisons $$x_{Ab} = \left[\!\left[ x_{Ar} \geq \left\lceil \frac{\Delta}{2} \right\rceil \right]\!\right] \text{ and } x_{Bb} = \left[\!\left[ x_{Br} \geq \left\lceil \frac{\Delta}{2} \right\rceil \right]\!\right]$$

are performed by each party independently. A can encrypt [$x_{Ab}$] and send it to B, who can perform $$\left(1 - 2\left[\!\left[ x_{Br} \geq \left\lceil \frac{\Delta}{2} \right\rceil \right]\!\right]\right) \cdot (1 - xor([[x_{Ab}]], [x_{Bb}]))$$

using only homomorphic operations. Each of the two needed interval checks can be performed through two comparison circuits and a homomorphic sum ([[x∈[a,b)]]=[[x≥a]]−[[x≥b]]). After obtaining these values, the whole expression can be evaluated with 5 homomorphic sums and 3 invocations of the secure multiplication protocol.

The total complexity calculated for the exact protocol, for a modulus bit-size |n|=l, is $$C_{EQcm}(n, \Delta) = \qquad (22)$$
$$|E| + 3C_{MULTcm} + 4C_{COMPcm}(\lceil \log_2 \Delta \rceil + 1) + C_{COMPcm}\left(\left\lceil \log_2 \frac{n}{\Delta} \right\rceil\right),$$

$$C_{EQcp,\mathcal{A}}(n, \Delta) = C_{EncBit} + 3C_{MULTcp,\mathcal{A}} + \qquad (23)$$
$$4C_{COMPcp,\mathcal{A}}(\lceil \log_2 \Delta \rceil + 1) + C_{COMPcp,\mathcal{A}}\left(\left\lceil \log_2 \frac{n}{\Delta} \right\rceil\right),$$

$$C_{EQcp,\mathcal{B}}(n, \Delta) = C_{Encrypt} + 2C_{EP} + 10C_{EA} + 3C_{MULTcp,\mathcal{B}} + \qquad (24)$$
$$4C_{COMPcp,\mathcal{B}}(\lceil \log_2 \Delta \rceil + 1) + C_{COMPcp,\mathcal{B}}\left(\left\lceil \log_2 \frac{n}{\Delta} \right\rceil\right),$$

where |E| represents the number of bits of an encryption (or share). The subindex cm stands for communication complexity, and cp for computational complexity for party A or B, being $C_{MULT_{xx}}$ the corresponding complexity of the interactive multiplication protocol; $C_{EA}$, $C_{EP}$ respectively denote the computational complexity of a homomorphic addition and product (by a known scalar) for the used cryptosystem (or secret sharing scheme), $C_{Encrypt}$ and $C_{EncBit}$ represent the computational complexity for encrypting (sharing) an integer in $Z_n$ or a bit respectively, and $C_{COMP_{xx}}(l)$ is defined in [27].

The fast protocol has complexity $$C_{EQfcm}(n, \Delta) = |E| + C_{COMPcm}\left(\lceil\log_2\frac{n}{\Delta}\rceil + 1\right), \quad (25)$$

$$C_{EQfcp,\mathcal{A}}(n, \Delta) = C_{COMPcp,\mathcal{A}}\left(\lceil\log_2\frac{n}{\Delta}\rceil + 1\right), \quad (26)$$

$$C_{EQfcp,\mathcal{B}}(n, \Delta) = C_{Encrypt} + C_{EP} + 2C_{EA} + C_{COMPcp,\mathcal{B}}\left(\lceil\log_2\frac{n}{\Delta}\rceil + 1\right). \quad (27)$$

Example Applications

Adaptive filtering has a considerable number of applications in the field of signal processing. They can be classified in four categories, namely identification, inverse modeling, prediction and interference cancellation. Within these categories, numerous applications are subject to privacy constraints and can benefit from the primitives that we present in this disclosure. In the following paragraphs, as illustrative examples of the applicability of our secure protocols, we briefly introduce some of them, mainly related to "multiuser communications" where the privacy of the users must be protected from each other and, in the cases where it exists, from the central processing server.

Adaptive Beamforming

Figure 5:
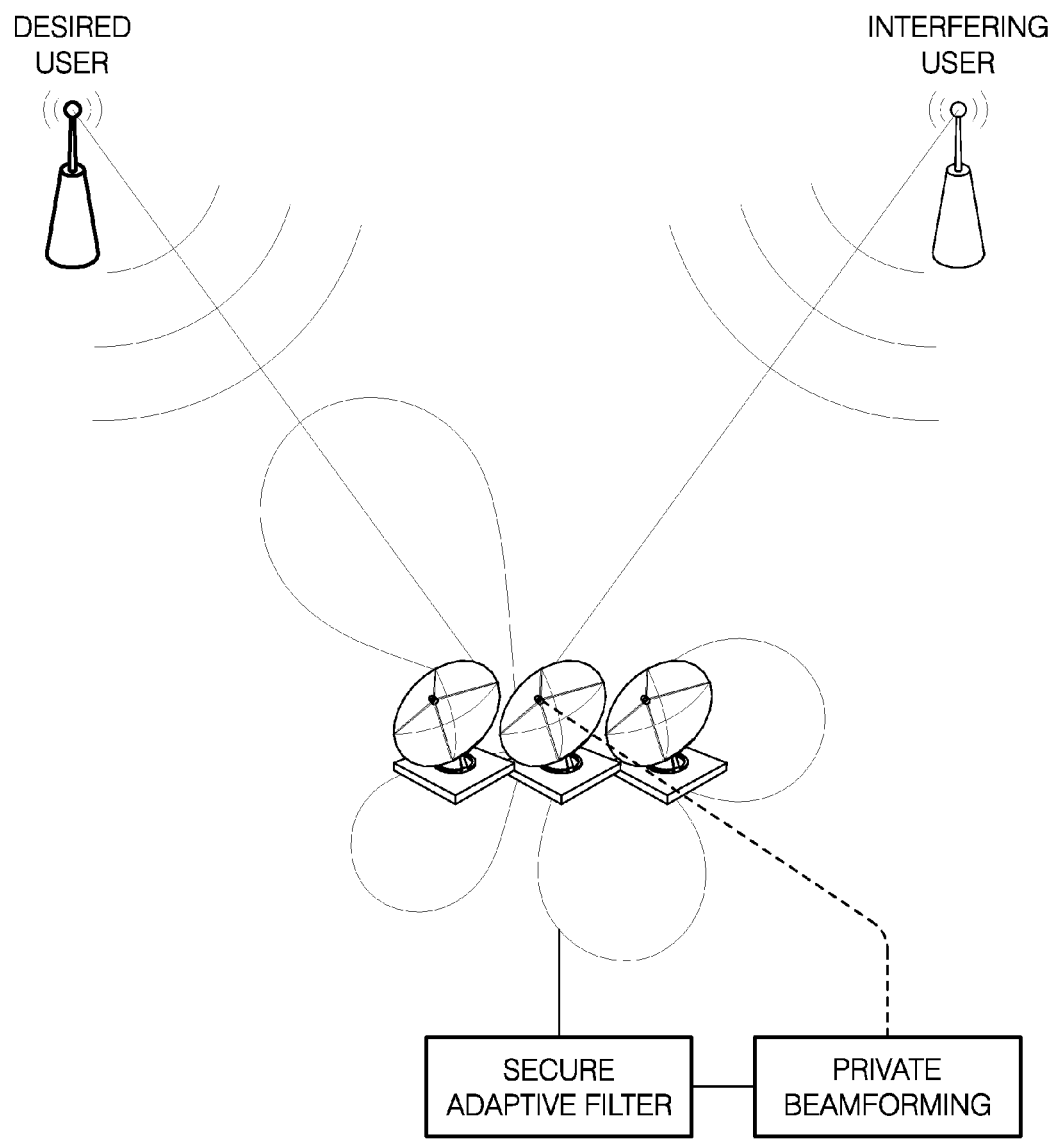
FIG. 5 shows an example of the private adaptive beamforming application scenario.

As an example application of embodiments of the methods presented herein, and without limitation, we can consider adaptive beam forming. Adaptive beamforming is a spatial application of adaptive filtering where a system composed of an array of antennas changes the directionality of the transmitted/received signal without mechanically moving the antennas. In the most common setting, the system must determine the spatial direction of the interfering signal and/or that of the target signal, and filter the sensed signals in order to cancel the former and extract the latter; it finds use in communications, radar, sonar or speech enhancement. The interfering signal comes usually from another source. The trust model in this scenario deals with, on the one hand, the protection of the transmitted/received target signal, and, on the other hand, the protection of the interfering signal and the spatial position of the interfering source. The two parties involved in the scenario are represented in the beamformer by the adaptive filtering mechanism that cleans the desired signal, and the model and pilot information for the desired signal. Again, this model fits perfectly in framework disclosed herein, and the protocols that we present can be straightforwardly adapted to this scenario. The private filtering block, as shown in FIG. 5 provides the adaptive weights applied to the received signals in order to adjust the directivity of the antenna array, without disclosing the contents of the interfering private signal; as in the private interference cancellation scenario, it must be complemented by another private block, denoted private beamforming block, that processes the mixed signals while concealing the private information.

As a specific example of this scenario, and without limitation, we could pose the problem of a cellular smart antenna, property of a mobile operator receiving signals (mixed into a signal $u_n$) from his own users and also from users of a second operator that subcontracts the infrastructure of the former. The latter operator (party A) has decryption capabilities (and reference signals $d_{n,i}$ for each of his users) and wants to perform adaptive beamforming to clean the signals $y_{n,i}$ from the clients without disclosing to the former (party B) their positions or the contents of the cleaned signals, in such a way that the information of the users of B is also not disclosed to A.

Private Model-Reference Adaptive Control

There are many control applications where the parameters of the controlled system are either not fully known or vary over time. Adaptive control yields a solution for maintaining consistent performance in these cases. It is used in many industrial contexts like, to name a few, robot manipulation, ship steering, aircraft control or metallurgical/chemical process control. Model-Reference Adaptive Control (MRAC) is one approach for constructing adaptive controllers. An MRAC system is composed of four elements:

A plant with a known structure but unknown parameters.

A reference model that specifies the desired output of the control system to the external command. It should match the performance specification while being achievable by the control system.

A feedback control law (controller) with adjustable parameters. It should guarantee tracking convergence and stability.

An adaptation mechanism for updating the adjustable parameters.

The trust model in this scenario can be devised as a two party model (involving privacy of system users at the plant and at the controller), where the plant outputs must be kept secret from the party that runs the controller, and the reference model that the controller applies must also be kept secret for the parties in the plant. In order to adaptively control the plant while keeping the privacy constraints, the same philosophy that we apply to LMS can be used to straightforwardly translate the protocols that we present for their use in this scenario.

As a specific example for this scenario, and without limitation, we could devise a spacecraft control system working with classified information coming from a vehicle in orbit, using an antenna under the control of a non-trusted party; the control information cannot be disclosed for keeping the management of the vehicle behavior secret. In this case, the party that emits the control (reference $d_n$) signal has decryption capabilities, while the non-trusted party that receives the vehicle's signals ($u_n$) can only encrypt.

Current privacy-preserving solutions cannot be directly applied to these scenarios due to the cipher blowup problem, that prevents the use of homomorphic computation alone. Our novel solutions to this problem presented above have a direct application in the aforementioned scenarios and present efficient private protocols that overcome cipher blowup, finding an optimal trade-off between precision and complexity.

Evaluation

In this section, we perform a comparison of the developed protocols in terms of bandwidth, computational complexity and finite precision effects, providing also an evaluation of the chosen techniques for each of the solutions, and their suitability for the application scenarios. In the next section we also introduce a practical implementation of our protocols, that we have used for measuring actual execution times on real machines.

Bandwidth

In terms of communication complexity, the estimated transferred bits for each of the protocols have been given together with their description in the previous section. All the protocols have a communication complexity linear on the number of iterations, the size of the filter and the size of the encryptions; nevertheless, the constants are not the same and the difference is perceptible and significant for normal values of the LMS parameters. As an exemplifying case, FIG. 6 and FIG. 7 show the number of communicated bits for each of the protocols for a varying number of iterations and filter length respectively; the length of the encryptions is chosen for mid-term security (2048 bits for Damgård-Jurik modulus, 224 bits for the elliptic curve modulus, and 80 bits for the statistical security parameter used in the conversion protocols).

Figure 6:
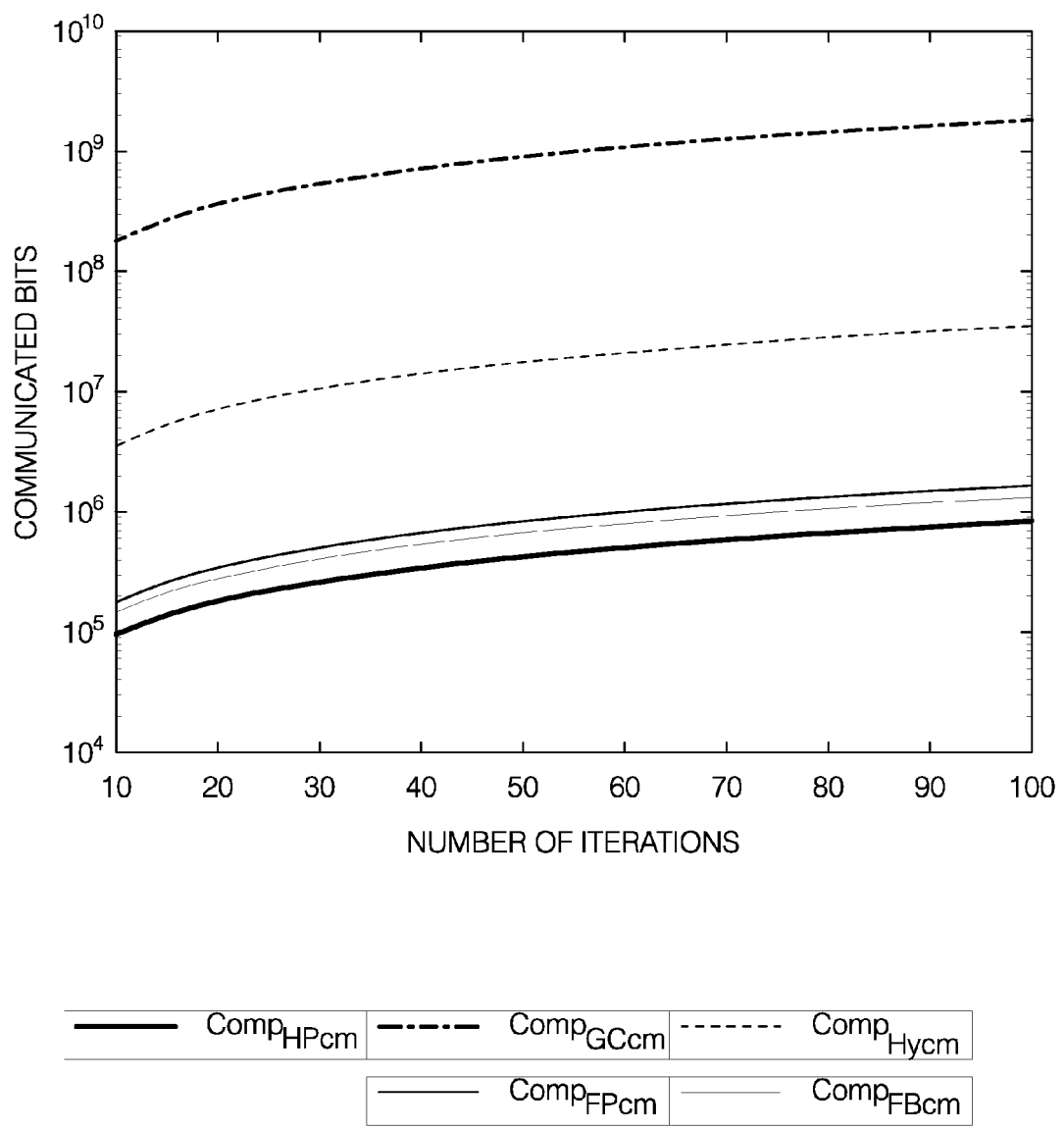
FIG. 6 shows the communication complexity as a function of the number of executed iterations with $N_E=5$ and the filter length with 50 iterations.
Figure 7:
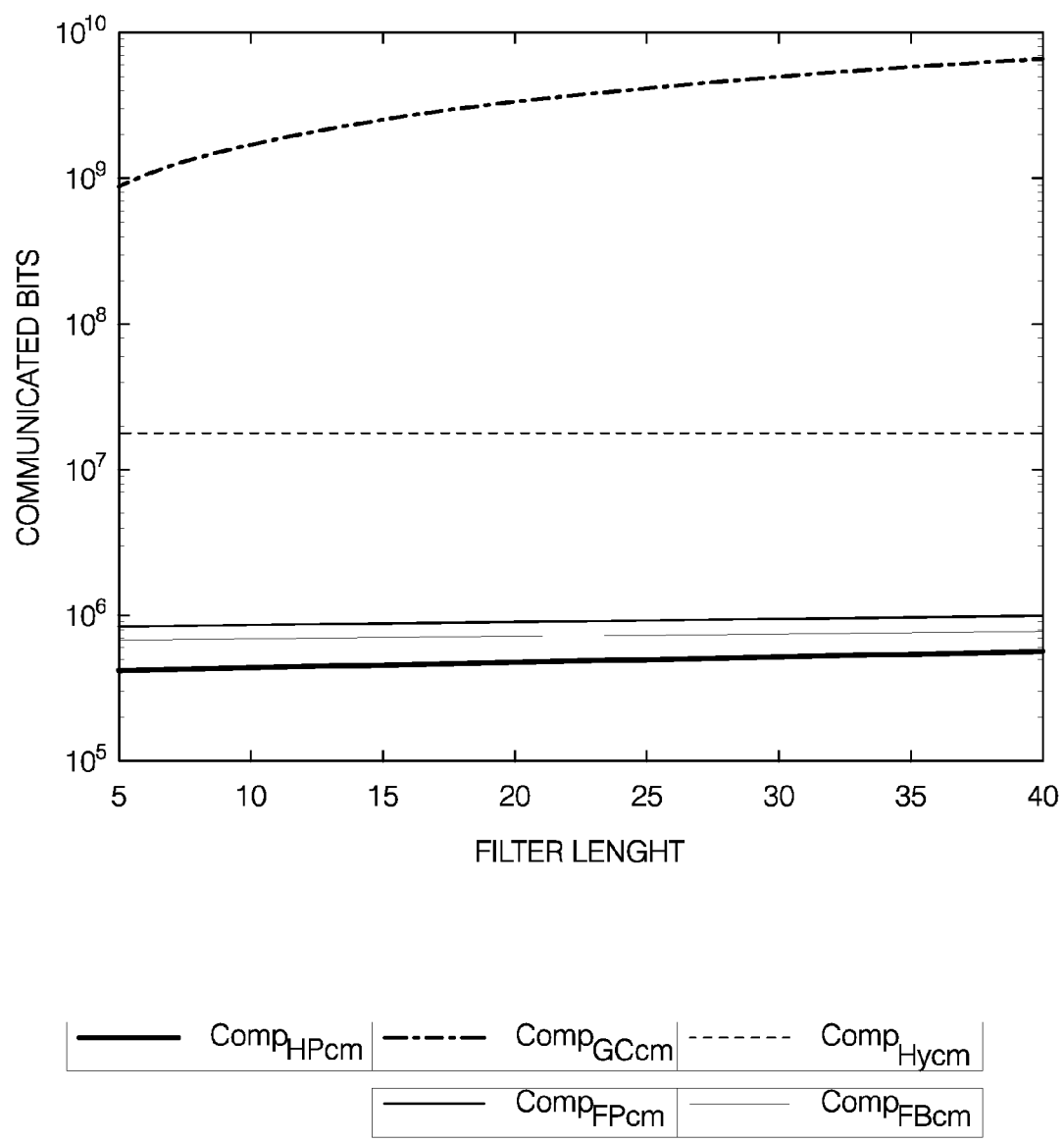
FIG. 7 shows the communication complexity as a function of the number of executed iterations with $N_E=5$ for $|E_H|=4096$, $|E_C|=224$, $n_{sec}=80$, $$N_b = \min\left(N_E, \left\lfloor \frac{n_{cipher}}{n_x + 3 \cdot n_f + n_{sec}} \right\rfloor\right),$$

The obtained results using 32-bit numbers with 16-bit fractional precision are shown for a 5 tap filter in FIG. 6 and for 50 iterations in FIG. 7. It can be seen that the bandwidth of the garbled circuit solutions-only garbled circuits (GC) and hybrid protocol (Hy)-is several orders of magnitude higher than that of the solutions including only homomorphic processing (HP). While the HP protocol needs to transfer two encryptions per iteration (8192 bits), the GC protocol communicates around 165 Mb per iteration for the chosen parameters. Hence, the communication complexity for the HP protocol and the fast protocols (FP and block FB) is higher than that of the clear-text protocols, but still practical; on the other hand, the bandwidth needed by the solutions that include garbled circuits make them almost totally infeasible for practical purposes, even when using small encryptions based on Elliptic Curves. The hybrid protocol presents, though, an intermediate complexity, due to the overhead, w.r.t. the HP solution, imposed by the use of conversion subprotocols for changing between bit-representation and homomorphic encryptions. This overhead will be translated in a decrease in computation load for the hybrid block protocol.

Error Analysis and Finite Precision Effects

One of the limitations of the presented protocols, inherent to privacy-preserving techniques that deal with encryption based on finite-fields, is the need of using fixed point arithmetic. This is actually not a severe issue, as current implementations of the traditional insecure algorithms also work with finite precision, but the flexibility of floating point yields a much wider range of representable values, and greatly improves on the quantization error propagated to the outputs of the algorithm. Numerical stability and numerical accuracy of the filters, that determine the resilience to quantization errors, come into play when dealing with fixed-point arithmetic.

While this issue is commonly avoided or mitigated by the use of a sufficiently large plaintext size to accommodate the needed precision, we believe that it is necessary to devote some space to calculating which is the needed precision and plaintext size for keeping the output Mean Square Error (MSE) within a given bound. In this section we review the error analysis of adaptive algorithms working with fixed-point arithmetic and apply it to the specific cases that our protocols involve. We assume that the inputs and outputs are quantized with $n_f$ bits for their fractional part (of the total $n_x$ bits used for coding), and the filter coefficients and some intermediate results are quantized with $n_{wf}$ bits and $n_{If}$ bits for their fractional part respectively.

Neglecting the overflow effects and assuming stationary $d_n$ and $u_n$ with variances $\sigma_d^2$ and $\sigma_u^2$, i.i.d. The calculations can be generalized to any $u_n$ through the rotated or uncoupled coordinate space [28], but the i.i.d. case is representative enough of the effects of fixed-point precision on the output error. $u_n$, and uniform and independent quantization errors of the inputs (with variance $$\sigma^2 = \frac{2^{-2n_f}}{12})$$

and intermediate values (with variance $$\sigma_I^2 = \frac{2^{-2n_{If}}}{12},$$

and $$\sigma_w^2 = \frac{2^{-2n_{wf}}}{12}$$

for the filter coefficients), it can be shown that the average power of the error (MSE, or Mean-Square Error) at the output in steady-state is $$\sigma_o^2(c, d) = \sigma_{min}^2 + \frac{\mu \sigma_{min}^2 trR}{2 - \mu trR} + \left(\|w^*\|^2 + \frac{1}{2}\mu\sigma_{min}^2 N_E\right)\sigma^2 + \quad (28)$$

$$N_E \sigma_w^2 + d \cdot trR\sigma_I^2 + \mu^2 \cdot \sigma^2$$

$$c\sigma_I^2 + \frac{\left(\left(1 + c\frac{\sigma_I^2}{\sigma^2} + \|w^*\|^2\right) \cdot trR + \sigma_{min}^2 N_E\right)}{2\mu - \mu^2 trR}$$

where the first two terms correspond to the error of the LMS filter with infinite precision, and the rest of the terms stem from quantization. In Eq. (28), $\sigma_{min}^2 = \sigma_d^2 - w^* E\{d_n u_n\}$ is the error of the optimum Wiener filter $w^*$, trR represents the trace of the input covariance matrix, and c and d are factors that depend on the way quantization is handled in multiplications:

$$c = \begin{cases} 1, & \text{if only the result of } w_n^T \cdot u_n \text{ in (1) is quantized} \\ N_E, & \text{if each intermediate product of } w_n^T \cdot u_n \text{ in (1) is quantized.} \end{cases} \quad (29)$$

$$d = \begin{cases} 1, & \text{if the product } \mu e_n \text{ is quantized before multiplying by } u_n \text{ in (2)} \\ 0, & \text{if there is no intermediate quantization in } \mu e_n u_n \text{ in (2).} \end{cases} \quad (30)$$

In this equation we have considered the most general case of having different quantization levels for inputs, filter coefficients, and also for intermediate values.

If only the inputs are quantized, but the intermediate operations do not perform any additional quantization, then the MSE at the output will be $$\sigma_{o,QI}^2 = \sigma_{min}^2 + \frac{\mu \sigma_{min}^2 trR}{2 - \mu trR} + \left(\|w^*\|^2 + \frac{1}{2}\mu\sigma_{min}^2 N_E\right)\sigma^2. \quad (31)$$

Hence, for the studied non-block protocols, the error at the output can be expressed as $$\sigma_{HP}^2 = \sigma_{o,QI}^2, \; \sigma_{GC}^2 = \sigma_o^2(N_E, 1), \; \sigma_{Hy}^2 = \sigma_o^2(1,0). \quad (32)$$

For the fast protocol, the quantization error has a different shape, but the independence assumptions can be applied exactly as in the other protocols, duplicating the power of this quantization error of the intermediate values, that becomes $\sigma_I^2 = 2^{-2n_{If}}/6$.

Block LMS Protocol

Below we provide the following approximation to the error in the Block LMS implementation:

$$\sigma_{o,Bk}^2(c, d, N_b) = \sigma_{min}^2 + \frac{\mu \sigma_{min}^2 trR}{2 - \mu trR} + \left(\|w^*\|^2 + \frac{1}{2}\mu\sigma_{min}^2 N_E\right)\sigma^2 + \quad (33)$$

$$\frac{N_E \sigma_w^2}{N_b} + d \cdot \left(N_E \frac{N_b - 1}{N_b}\sigma_w^2 + \sigma_I^2 tr(R)\right) + \mu^2 \cdot$$

$$c\sigma_I^2 + \frac{\sigma^2\left(\left(1 + c\frac{\sigma_I^2}{\sigma^2} + \|w^*\|^2\right) \cdot trR + \sigma_{min}^2 N_E\right)}{2\mu - \mu^2 N_b trR}$$

where c has the same meaning as in Eq. (28), $N_b$ is the block size, and d=1 when each product in $\mu\Sigma_k e_k u_k$ in (4) is individually quantized, and d=0 otherwise.

This result is coherent with the one obtained by Eweda et al. [29] for the adaptive system identification problem, but Eq. (47) is more general and takes into account more parameters that allow for a greater flexibility in predicting the error of our implementations. It can be seen that for the same step size $\mu$, both infinite-precision LMS and BLMS have the same misadjustment (first two terms in Eq. (47)) and the same average time constant. For the finite-precision algorithms, Eq. (47) shows that the BLMS reduces the sensitivity to the quantization error in the filter coefficients when d=0 (first term of the numerator), but the sensitivity to the quantization of the inputs is not altered (third term in Eq. (47)); quantization of the filter coefficients has a much more critical and noticeable effect than the quantization of the input values when $\sigma^2$ and $\sigma_w^2$ are comparable, what motivates the conclusions in [29] about the better behavior of BLMS; nevertheless, when $\sigma^2 \gg \sigma_w^2$, the averaging performed by BLMS has a negligible impact on quantization error resilience; hence, for the same convergence speed, BLMS presents an MSE similar to that of LMS.

Transient Deviation Due to Finite Precision

As shown in the previous sections, the use of fixed-point precision affects the stationary regime of the algorithms, producing a higher level of noise. Actually, the effect of finite precision is also noticeable in the transient period, introducing errors during tracking and altering the adaptation behavior. Following a similar derivation to that in [30], we have extended the theoretical adaptation curve to the BLMS algorithm. The result for the weight vector misadjustment $M_n = E[\Delta w_n^T \Delta w_n]$, for the same assumptions as in previous sections, is $$M_n = \quad (34)$$

$$\mu^2 \cdot N_b \cdot N_E \cdot \left[A \cdot n\gamma^{2(n-1)} + \frac{A}{\gamma - \gamma^2}(\gamma^n - \gamma^{2n}) + \frac{B}{1 - \gamma^2}(1 - \gamma^{2n})\right] +$$

$$\frac{N_E \sigma_w^2}{1 - \gamma^2}(1 - \gamma^{2n}),$$

with $$A = 2\sigma^2\sigma_u^2\|w^*\|^2, \quad B = \sigma_u^2[\sigma^2(1 + \|w^*\|^2) + c\sigma_I^2] + \sigma^2$$
$$\sigma_{min}^2, \; \gamma = 1 - \mu N_b \sigma_u^2. \quad (35)$$

Eq. (34) gives the evolution of the MSE of the filter coefficients that the finite precision algorithm introduces with respect to the infinite precision LMS during the adaptation period. The notation and parameters are the same as for Eq. (47). This error evolves with a fixed time constant, equal to that of the infinite precision algorithm, until reaching the stationary state for which the output error is given by Eq. (47). This evolution is shown in FIG. 8 for the hybrid protocol for different values of the adaptation step and used fractional bits. For a fair comparison, it must be taken into account that the index n refers to successive updates of the vector coefficients, that in BLMS are produced every $N_b$ output samples instead of every sample.

Complete Derivations of Finite-Precision Error Analysis of the Block LMS Protocol The following is a derivation to obtain the steady-state error of the BLMS algorithm in the presence of quantization errors. We assume stationary $d_n$ and $u_n$ with variances $\sigma_d^2$ and $\sigma_u^2$. The calculations can be generalized to any $u_n$ through the rotated or uncoupled coordinate space [28], but the i.i.d. case is representative enough of the effects of fixed-point precision on the output error. $u_n$. We will use the same notation of primed symbols for quantized values and unprimed symbols for infinite precision ones, and Greek letters for the corresponding quantization error. The inputs and outputs are quantized with $n_f$ bits for their fractional part (of the total $n_x$ bits used for coding), and the filter coefficients and some intermediate results are quantized with $n_{wf}$ bits and $n_{If}$ bits for their fractional part respectively, producing errors of power $$\sigma_w^2 = \frac{2^{-2n_{wf}}}{12} \text{ and } \sigma_I^2 = \frac{2^{-2n_{If}}}{12}.$$

Let us assume that there are no overflows in any of the computations, and a value a is quantized with its corresponding bit-size for the fractional part (i.e., $n_{f,a}$ bits), producing a uniform and independent quantization error of power $$\sigma_a^2 = \frac{2^{-2n_{f,a}}}{12}.$$

For the input sequences, $$u'_n = u_n + \alpha_n \; d'_n = d_n + \beta_n,$$

where $\alpha_n$ and $\beta_n$ are white, mutually independent, and independent of the signals, with zero mean and variance $$\sigma^2 = \frac{2^{-2n_f}}{12},$$

while the filter coefficients are such that $$w'_n = w_n + \rho_n, \quad (36)$$

being $\rho_n$ a vector of quantization errors of length $N_E$.

Finally, the output is $$y'_n = w'^T_n u'_n + \eta_n = w_n^T u_n + \rho_n^T u_n + w_n^T \alpha_n + \eta_n,$$

where $\eta_n$ is an approximately white sequence of quantization noise independent of the signals and the rest of the error sequences, with zero mean and variance $c \cdot \sigma_I^2$, with $$c = \begin{cases} 1, & \text{if only the result of } w_n^T \cdot u_n \text{ in (1) is quantized} \\ N_E, & \text{if each intermediate product of } w_n^T \cdot u_n \text{ in} \\ & \text{(1) is quantized} \end{cases} \quad (37)$$

Hence, the estimation error $e'_n$ is $$e'_n = d_n - y'_n = \underbrace{d_n - w_n^T u_n}_{e_n} - (\rho_n^T u_n + w_n^T \alpha_n + \eta_n).$$

Up to this point, the analysis does not deviate from that of the LMS algorithm, and the only difference resides at the calculation of $w_n$, and that all the $y'_{n \cdot N_b + k}$, $k = \{0, \ldots, N_b - 1\}$ share the same $w_{n \cdot N_b + k} = w_{n \cdot N_b}$, $k = \{0, \ldots, N_b - 1\}$. For the sake of clarity, we will use the subindices n and k as $w_n \equiv w_{n \cdot N_b}$ and $a_k \equiv a_{n \cdot N_{b+k}}$, when there is no ambiguity. The following independent assumptions are applicable:

$\alpha_k$, $\beta_k$ and $\eta_k$ are independent of the data and of each other; hence, $\rho_n^T u_k$, $w_n^T \alpha_k$, $\eta_k$ and $\beta_k$ are uncorrelated.

$e_k$ is also uncorrelated to $w_n^T \alpha_k$, $\eta_k$ and $\beta_k$.

$\rho_n$ depends on data up to time $nN_b - 1$.

Then, the total output mean square error is $$E[e_k'^2] = E[e_k^2] - 2E[e_k \rho_n^T u_k] + E[(\rho_n^T u_k)^2] + E[(w_n^T \alpha_k)^2] + E[\eta_k^2]. \quad (38)$$

$E[e_k^2]$ This term is the MSE of the infinite precision (B)LMS, and it is given by [31]

$$E[e_k^2] = \sigma_{min}^2 + \frac{\mu \sigma_{min}^2 trR}{2 - \mu trR}.$$

$E[(w_n^T \alpha_k)^2] = E[w_n^T w_n] \sigma^2$ For the BLMS, the update equation (4) can be expressed as $$w_{n+1} = w_n - \frac{\mu N_b}{2} \underbrace{\frac{-2}{N_b} \sum_{l=(n-1)N_b}^{nN_b - 1} u_l e_l}_{\hat{\nabla}_n}, \quad (39)$$

being $\hat{\nabla}_n = \nabla_n + N_n$ the estimate of the true gradient $\nabla_n$ used for the gradient descent algorithm, together with an additive zero-mean estimation noise $N_n$. When $w_n$ is near the optimal Wiener solution $w^*$, the gradient approaches zero, and the estimate captures only the estimation noise $$N_n \approx \frac{-2}{N_b} \sum_{l=(n-1)N_b}^{nN_b - 1} u_l e_l,$$

being $e_l$ and $u_l$ uncorrelated. For the sake of clarity, we will omit the ranges of the indices from now on where there is no ambiguity Hence, the covariance of the gradient is $$cov(N_n) = \frac{4}{N_b^2} E\left[\sum_{k,m}(u_k e_k)(u_m e_m)^T\right]$$

-continued $$= \frac{4}{N_b^2} E\left[\sum_{k,m}(e_k e_m u_k u_m^T)\right]$$

$$= \frac{4}{N_b^2} \sum_k E[e_k^2] E[u_k u_k^T]$$

$$\approx \frac{4}{N_b} \sigma_{min}^2 R.$$

Each of the previous steps is justified by the independence assumptions, and the last approximation comes from considering the error $E[e_k^2]$ when $w_n$, approaches $w^*$ equal to that of the optimum Wiener filter $\sigma_{min}^2$. Substituting the weight-vector noise $v_n = w_n - w^*$ in (39) and developing $$w_{n+1} = w_n + \frac{\mu N_b}{2}(-\nabla_n - N_n)$$

$$\Rightarrow v_{n+1} = v_n + \frac{\mu N_b}{2}(-2R \cdot v_n - N_n) = v_n(I - \mu N_b R) - \frac{\mu N_b}{2} N_n.$$

In steady-state regime, the mean of $v_n$ is zero and its covariance is $$cov(v_n) = (I - \mu N_b R)^2 cov(v_n) + \frac{\mu^2 N_b^2}{4} cov(N_n)$$

$$= (I - \mu N_b R)^2 cov(v_n) + \mu^2 N_b \sigma_{min}^2 R$$

$$\Rightarrow (2\mu N_b R - \mu^2 N_b^2 RR) cov(v_n) = \mu^2 N_b \sigma_{min}^2 R$$

$$\Rightarrow (2I - \mu N_b R) cov(v_n) = \mu \sigma_{min}^2 I$$

$$\Rightarrow cov(v_n) \approx \frac{\mu}{2} \sigma_{min}^2 I.$$

The last step neglects $$\frac{\mu N_b}{2} \sigma_u^2 \ll 1.$$

Finally, $$E[(w_n^T \alpha_k)^2] = E[w_n^T w_n] \sigma^2 \quad (40)$$

$$= E[(w_n - w^* + w^*)^T(w_n - w^* + w^*)] \sigma^2$$

$$= (\|w^*\|^2 + E[v_n^T v_n]) \sigma^2$$

$$= (\|w^*\|^2 + tr(cov(v_n))) \sigma^2$$

$$= \left(\|w^*\|^2 + \frac{\mu N_E}{2} \sigma_{min}^2\right) \sigma^2.$$

$E[(\rho_n^T u_k)^2]$ $$E[(\rho_n^T u_k)^2] = tr\{E[\rho_n^T \rho_n]R\}.$$

The update equation with finite precision is $$w'_{n+1} = w'_n + \mu \sum_k u'_k e'_k + \varsigma_n \quad (41)$$

$$= w'_n + \mu \sum_k u_k e_k - \mu \sum_k u_k u_k^T \rho_n -$$

-continued $$\mu \sum_k u_k w_n^T \alpha_k +$$

$$\mu \sum_k u_k(\beta_k - \eta_k) + \mu \sum_k \alpha_k e_k + \varsigma_n,$$

where $\varsigma_n$ is the error produced by the quantization in the sum $\mu\Sigma_k u'_k e'_k$. In the case of the Block LMS, the quantization is only performed after the sum: $Q(\mu\Sigma_k u'_k e'_k)$, producing an error of power $\sigma_w^2$; for completeness and to cover all the practical cases, we will preserve the same parameter d used for the LMS, with a slightly changed meaning:

$$d = \begin{cases} 1, & \text{if each product of the sum } \mu\sum_k e_k u_k \text{ is} \\ & \text{individually quantized in (4)} \\ & \text{if there is no intermediate quantization in} \\ 0, & \mu\sum_k e_k u_k \text{ in (4).} \end{cases} \quad (42)$$

From (36) and (41), the coefficients error vector $\rho$ has the following update equation $$\rho_{n+1} = F_n \rho_n + b_n, \quad (43)$$

with $$F_n = I - \mu \sum_k u_k u_k^T,$$

$$b_n = \mu\left(\sum_k u_k w_n^T \alpha_k + \sum_k u_k(\beta_k - \eta_k) + \sum_k \alpha_k e_k\right) + \varsigma_k.$$

After operating, we obtain $$E[\rho_{n+1}\rho_{n+1}^T] = E[F_n \rho_n \rho_n^T F_n^T] + \quad (44)$$

$$\mu^2(E[w_n w_n^T]N_b\sigma^2 R + N_b(\sigma^2 + c\sigma_I^2)R + N_b\sigma^2 E[e_n^2]I) +$$

$$\sigma_w^2 I + d((N_b - 1)\sigma_w^2 I + N_b\sigma_I^2 R) \approx E[f_n \rho_n \rho_n^T F_n^T] +$$

$$\underbrace{\mu^2(\|w^*\|^2 N_b \sigma^2 R + N_b(\sigma^2 + c\sigma_I^2)R + N_b\sigma^2 \sigma_{min}^2 I) +}_{Q_n}$$
$$\underbrace{\sigma_w^2 I + d((N_b - 1)\sigma_w^2 I + N_b\sigma_I^2 R)}_{Q_n},$$

where the last approximation comes from the steady-state regime assumption. Using the approximation for the first term (neglect PRP w.r.t. $\mathrm{R}tr(RP_n)$), and denoting $P_n = E[\rho_n \rho_n^T]$, we get $$P_{n+1} \approx P_n - \mu N_b(RP_n + P_n R) + \mu^2 N_b^2 Rtr(RP_n) + Q_n.$$

In steady-state $P_{n+1} = P_n$, and $$tr(RP_n) = \frac{tr(Q_n)}{2\mu N_b - \mu^2 N_b^2 tr(R)}. \quad (45)$$

Substituting in (45) the definition of $Q_n$ (44), and the result in (40), we obtain $$E[(\rho_n^T u_k)^2] = \frac{\mu^2 N_b \sigma^2\left(\left(1 + c\frac{\sigma_I^2}{\sigma^2} + \|w^*\|^2\right)tr(R) + N_E\sigma_{min}^2\right) +}{2\mu N_b - \mu^2 N_b^2 tr R} \frac{N_E \sigma_w^2 + d(N_E(N_b - 1)\sigma_w^2 + N_b\sigma_I^2 tr(R))}{2\mu N_b - \mu^2 N_b^2 tr R} \quad (46)$$

$-2E[e_n \rho_n^T u_n]$ Due to the independence of $\rho_n$ and data at time n and due to (43), this term is zero.

Substituting back each of the terms in (38), the final expression for the MSE in the Block LMS implementation is obtained:

$$\sigma_{o,Bk}^2(c, d, N_b) = \quad (47)$$

$$\frac{N_E \sigma_w^2}{N_b} + d \cdot \left(N_E \frac{N_b - 1}{N_b}\sigma_w^2 + \sigma_I^2 tr(R)\right) +$$

$$\sigma_{min}^2 + \frac{\mu\sigma_{min}^2 tr R}{2 - \mu tr R} + \frac{\mu^2 \cdot \sigma^2\left(\left(1 + c\frac{\sigma_I^2}{\sigma^2} + \|w^*\|^2\right) \cdot tr R + \sigma_{min}^2 N_E\right)}{2\mu - \mu^2 N_b tr R} +$$

$$\left(\|w^*\|^2 + \frac{1}{2}\mu\sigma_{min}^2 N_E\right)\sigma^2 + c\sigma_I^2.$$

This result is coherent with the one obtained by Eweda et al. [29] for the adaptive system identification problem, but Eq. (47) is more general and takes into account more parameters that allow for a greater flexibility in predicting the error of our implementations. It can be seen that for the same step size $\mu$, both infinite-precision LMS and BLMS have the same misadjustment (first two terms in Eq. (47)) and the same average time constant. For the finite-precision algorithms, Eq. (47) shows that the BLMS reduces the sensitivity to the quantization error in the filter coefficients when d=0 (first term of the numerator), but the sensitivity to the quantization of the inputs is not altered (penultimate term in Eq. (47)); quantization of the filter coefficients has a much more critical and noticeable effect than the quantization of the input values when $\sigma^2$ and $\sigma_w^2$ are comparable, what motivates the conclusions in [29] about the better behavior of BLMS; nevertheless, when $\sigma^2 \gg \sigma_w^2$, the averaging performed by BLMS has a negligible impact on quantization error resilience; hence, for the same convergence speed, BLMS presents an MSE similar to LMS.

As shown in the previous sections, the use of fixed-point precision affects the stationary regime of the algorithms, producing a higher level of noise. Actually, the effect of finite precision is also noticeable in the transient period, introducing errors during tracking and altering the adaptation behavior. Following a similar derivation to that in [30], we have extended the theoretical adaptation curve to the BLMS algorithm. The target is to calculate the evolution of the weight vector misadjustment, defined as $M_n = E[\rho_n^T \rho_n] = tr(E[\rho_n \rho_n^T])$. Using the same notation as in the previous section, and the same independence assumptions, the quantization error propagated to the prediction error signal is $$e'_n - e_n = \sum_k (\beta_k - \eta_k - (\rho_n u_k + w_n^T \alpha_k + \rho_n^T \alpha_k)).$$

Operating on (41) and including all the second order terms, we get $$w_{n+1} + \rho_{n+1} = \underbrace{w_n + \mu \sum_k u_k e_k + z_n + B_n \rho_n}_{w_{n+1}}$$

$$\Rightarrow \rho_{n+1} = b_n + F_n \rho_n,$$

we redefine $F_n$ and $b_n$ to incorporate the neglected terms in the previous formulation $$F_n = I - \mu \sum_k (u_k u_k^T + u_k \alpha_k^T + \alpha_k u_k^T + \alpha_k \alpha_k^T) \quad (48)$$

$$b_n = \varsigma_n + \mu \sum_k ((\beta_k - \eta_k - w_n^T \alpha_k) \cdot (u_k + \alpha_k) + e_k \alpha_k).$$

Since the errors are assumed to be uncorrelated, $$P_{n+1} = E[\rho_{n+1} \rho_{n+1}^T] = E[F_n \rho_n \rho_n^T F_n] + E[b_n b_n^T]. \quad (49)$$

For the first term, splitting $$F_n = \underbrace{I - \mu \sum_k u_k u_k^T}_{F_n^{(1)}} - \underbrace{\mu \sum_k (u_k \alpha_k^T + \alpha_k u_k^T + \alpha_k \alpha_k^T)}_{F_n^{(2)}},$$

and developing each of the terms of the product $E[(F_n^{(1)} + F_n^{(2)}) \rho_n \rho_n^{(T)} (F_n^{(1)} + F_n^{(2)})]$, assuming i.i.d. $u_n$ (i.e., the autocorrelation matrix is diagonal and its eigenvalues matrix is $\Lambda = R$), neglecting $\sigma^4 << \sigma^2$, we obtain $$E[F_n \rho_n \rho_n^T F_n] = ((I - \mu N_b \Lambda)^2 - 2\mu N_b \sigma^2 (I - \mu N_b \Lambda) + 4\mu^2 N_b \sigma^2 \Lambda) P_n. \quad (50)$$

For the second term, $b_n$ can also be split into two uncorrelated terms (due to the errors being uncorrelated and zero-mean)

$$b_n = \underbrace{\mu \sum_k (e_k \alpha_k + (\beta_k - \eta_k) u_k - u_k w_n^T \alpha_k - \alpha_k \alpha_k^T w_n)}_{b_n^{(1)}} + \underbrace{\varsigma_n + \mu \sum_k ((\beta_k - \eta_k) \alpha_k)}_{b_n^{(2)}}.$$

Hence, the second term, neglecting $\sigma^2(\sigma^2 + \sigma_I^2)$, is $$E[b_n b_n^T] \approx (\mu^2 N_b \sigma^2 E[e_n^2] + \sigma_w^2) I + \mu^2 N_b (\sigma^2 \|w_n\|^2 + \sigma^2 + \sigma_I^2) \Lambda. \quad (51)$$

Substituting (50) and (51) in (49), $$P_{n+1} = ((I - \mu N_b \Lambda)^2 - 2\mu N_b \sigma^2 (I - \mu N_b \Lambda) + 4\mu^2 N_b \sigma^2 \Lambda) P_n + (\mu^2 N_b \sigma^2 E[e_n^2] + \sigma_w^2) I + \mu^2 N_b (\sigma^2 \|w_n\|^2 + \sigma^2 + \sigma_I^2) \Lambda. \quad (52)$$

Neglecting the second order effects of the gradient noise, and taking into account that for BLMS, the update matrix for the error given by the direct-averaging method [31] is $E[I - \mu \Sigma_k u_k u_k^T] = I - \mu N_b R$, the functions $E[e_n^2]$ and $\|w_n\|^2$ can be respectively approximated by $$E[e_n^2] \approx \sigma_{min}^2 + \sum_{k=0}^{N_E - 1} \lambda_k w_k^{*2} \cdot (1 - \mu N_b \lambda_k)^{2n} \quad (53)$$

$$\|w_n\|^2 \approx \sum_{k=0}^{N_E - 1} w_k^{*2} \cdot (1 - (1 - \mu N_b \lambda_k)^n)^2, \quad (54)$$

being $w_k^*$ the kth component of the optimum Wiener filter, and $\lambda_k$ the kth eigenvalue of R; for an i.i.d. $u_n$, $\lambda_k = \sigma_u^2$, $k = \{0, \ldots, N_E - 1\}$. Taking this into account, substituting (53) and (54) in (52), and neglecting $\mu \sigma^2 << 1$, we have $$\mathcal{M}_{n+1} = \gamma^2 \mathcal{M}_n + \mu^2 N_b N_E \left( \underbrace{2\sigma^2 \sigma_u^2 \|w^*\|^2 (\gamma^{2n} - \gamma^n)}_{A} + \underbrace{\frac{B}{\sigma_u^2(\sigma^2(1 + \|w^*\|^2) + c\sigma_I^2) + \sigma^2 \sigma_{min}^2}}_{B} \right) + N_E \sigma_w^2, \quad (55)$$

with $\gamma = 1 - \mu N_b \sigma_u^2$. Finally, solving the difference equation, we have $$\mathcal{M}_n = \quad (56)$$

$$\mu^2 \cdot N_b \cdot N_E \cdot \left[ A \cdot n \cdot \gamma^{2(n-1)} + \frac{A}{\gamma - \gamma^2}(\gamma^n - \gamma^{2n}) + \frac{B}{1 - \gamma^2}(1 - \gamma^{2n}) \right] + \frac{N_E \sigma_w^2}{1 - \gamma^2}(1 - \gamma^{2n}),$$

Eq. (56) gives the evolution of the MSE of the filter coefficients that the finite precision algorithm introduces with respect to the infinite precision LMS during the adaptation period. The notation and parameters are the same as for Eq. (47). This error evolves with a fixed time constant, equal to that of the infinite precision algorithm, until reaching the stationary state for which the output error is given by Eq. (47). For a fair comparison, it must be taken into account that the index n refers to successive updates of the vector coefficients, that in BLMS are produced every $N_b$ output samples instead of every sample.

Comparison and Evaluation

FIG. 9 shows a representative case of the excess MSE (i.e., $E\{e^2\} - \sigma_{LMS\infty}^2$) with respect to the infinite precision LMS, obtained for each of the proposed protocols for varying bit-size of the fractional part. The theoretical approximations given by Eq (47) are labeled with the subindex th, and the experimental results, with the subindex exp. The Garbled Circuit implementation presents the highest error, mainly due to the use of the same bit size for vector coefficients as for input quantization, and the quantization performed after each multiplication. The hybrid protocol is the most robust against quantization errors, due to the use of a higher resolution for the vector coefficients, and the presence of quantization only in the outputs, and in no other internal calculations. On the other hand, the fast protocol presents a MSE slightly higher than the hybrid protocol, due to the approximate quantization of the outputs. Finally, the MSE produced by the block protocols is virtually the same as the MSE of the corresponding non-block implementations, due to the predominant effect of input quantization over that of filter coefficients quantization. The experimental results are obtained as the average error after running the algorithms for 40968 iterations in steady-state regime, for the system identification setup with $\sigma_u^2 = 0.25$, $\sigma_d^2 = 0.2821$, $\mu = 2^{-8}$, $\sigma_{min}^2 = 2.5 \cdot 10^{-5}$ and $\sigma_{LMS\infty}^2 = 2.5147 \cdot 10^{-5}$. The homomorphic processing protocol is not shown, as its cipher blows up before reaching the steady-state in practical cases; e.g., a modulus of 2048 bits can only hold 28 iterations using 48 bit numbers with 8 bits for the fractional part. Nevertheless, in theory and with a big enough cipher, it would be the most robust protocol due to the absence of intermediate quantizations. Besides this protocol, the concordance between the theoretical approximation and the experimental results in all the other protocols is remarkable, given the magnitude of the errors with which we are working, assessing the validity of the initial assumptions for obtaining Eq (47).

There are several effects noticeable in FIG. 9 that deserve a comment: on the one hand, the experimental results for the Garbled Circuit protocol are not shown, as for the used bit-sizes the precision used for filter coefficients is too low (equal to that of the inputs and intermediate results), and it suffers from stalling effects, that prevent it from converging; as a consequence, it needs a much higher precision in order to avoid stalling, and even when converging, as shown in the plot, the error that it produces is significantly higher than that of the other protocols. The second observable fact is that the gap of precision in block protocols is almost negligible when $\sigma^2 \gg \sigma_w^2$. This difference is not noticeable in FIG. 9, and it would only be significant with very long blocks $N_b \gg 1$ or with $\sigma^2 \approx \sigma_w^2$. The way our protocols are designed avoids this second condition, as they use always a higher precision for the filter coefficients than for the inputs/outputs.

At last, the value of $N_b$ is limited by the maximum plaintext size and the number of bits used for representing each number. Thus, Eq. (47) can be used together with the packing limits for the block protocols $$N_b^{(FB)} \leq \left\lfloor \frac{n_{cipher}}{n_b + n_{sec}} \right\rfloor,$$

$$N_b^{(HB)} \leq \left\lfloor \frac{n_{cipher} - n_{sec}}{n_b} \right\rfloor,$$

for finding a trade-off between the committed error due to the used precision, and the complexity of both protocols, dependent on the number of coefficients that are packed together.

Practical Implementation

In this section, we present and comment the results of a practical implementation of the proposed protocols. For this purpose, we have chosen the Damgård-Jurik [15] extension of Paillier cryptosystem, due to its flexibility for fitting larger plaintexts with a constant expansion ratio. For the protocols involving garbled circuits, we have chosen the XOR-free garbled circuit solution in [22], and the efficient oblivious transfer protocols of [23] with EC-ElGamal encryptions, aiming to the most efficient algorithms currently available for implementing garbled circuits.

Certain specific details are set forth in the following description and figures to provide a thorough understanding of various embodiments disclosed. Certain well-known details often associated with computing and software technology are not set forth in the following disclosure to avoid unnecessarily obscuring the various disclosed embodiments. Further, those of ordinary skill in the relevant art will understand that they can practice other embodiments without one or more of the details described below. Aspects of the disclosed embodiments may be implemented in the general context of computer-executable instructions, such as program modules, being executed by a computer, computer server, or device containing a processor. Generally, program modules include routines, programs, objects, components, data structures, etc. that perform particular tasks or implement particular abstract data types. Aspects of the disclosed embodiments may also be practiced in distributed computing environments where tasks are performed by remote processing devices that are linked through a communications network. In a distributed computing environment, program modules may be located in both local and remote storage media including memory storage devices. Those skilled in the art will appreciate that, given the description of the modules comprising the disclosed embodiments provided in this specification, it is a routine matter to provide working systems which will work on a variety of known and commonly available technologies capable of incorporating the features described herein. According to other embodiments the disclosed methods can be implemented in other hardware besides a digital computer including microcontrollers, DSPs, FPGAs or ASICs, as well as in embedded firmware.

For the evaluation of computational complexity, we have implemented the presented protocols and their block versions in C++ using the crypto++ library [32] for the elliptic curves cryptosystems, and the GNU GMP library [33] for multi-precision arithmetic, and we have provided our own implementation of Damgård-Jurik encryptions, with some efficiency improvements in modular exponentiations. We use these implementations in order to plot the execution times of the three protocols and compare them in terms of CPU usage. We have made the whole software package of our implementation available at [34].

Computational Load

We have measured the computational load of the developed algorithms through the total computation time that their efficient implementation yields on a PC with no parallelization, for a fair comparison. Nevertheless, these protocols, and especially their block versions, are easily parallelizable, obtaining a great reduction in execution time when several cores are available. The experiments were performed using our C++ implementation on an Intel Core2Duo processor at 3 GHz with 4 GB of RAM running a 64-bit linux distribution. In order to measure only computation times, we have neglected the communication stack, and we have run in the same core the client and the server sequentially, obtaining the aggregated computation times for both parties.

FIG. 10 shows the aggregated computation time for the 48 initial iterations of each of the presented protocols, as a function of the filter size. The three protocols involving garbled circuits are the most expensive ones, due to the load that oblivious transfers impose. While this load is normally absorbed through precomputation, with an adaptive algorithm it is not possible to perform the heavy encryption operations a priori, as they involve the results generated in each iteration; hence, no precomputation is applied to any of the performed operations. This has also an impact on their parallelization, as each oblivious transfer round involves only the bits of one input. This is especially critical in the case of the hybrid protocol, as the small OTs in each iteration cannot be joined together into a longer and more efficiently reducible OT. On the other hand, the packing performed in the hybrid block protocol allows for this reduction, greatly improving computational load as the number of packed coefficients (chosen to equal the size of the filter) increases.

Finally, the execution times of the fast protocols are several orders of magnitude below those of the garbled circuits solutions, and slightly increase the complexity of the homomorphic computation protocol due to the addition of the rounding protocols. This is a remarkable result, taking into account that without this rounding subprotocols, the whole homomorphic computation protocol is completely unusable due to cipher blowup. For the fast protocol, the block-based one does not improve on the computational load, as the fast rounding protocol requires a whole unpacking protocol for each of the packed numbers, and it does not yield the same improvement as in the hybrid block protocol. Hence, the fast protocol is more time-efficient than its block version.

Alternative Embodiments

Addressing privacy in adaptive filtering applications is an important open issue in the field of Signal Processing in the Encrypted Domain. In this disclosure, we have presented the problem of privacy-preserving adaptive filtering, with several representative scenarios and their trust model and privacy requirements. Due to the impossibility of using a practical full homomorphism, we have proposed several novel solutions employing different techniques, like garbled circuits, additive homomorphisms and interactive protocols, looking for the optimal trade-off in terms of complexity and output error; we have also provided several private quantization algorithms of independent interest to tackle the cipher blowup problem; we have implemented all our novel protocols for the Private LMS algorithm in a working prototype, and we have performed a comparison in terms of bandwidth and computational complexity, concluding that garbled circuits are still far from providing an efficient solution to adaptive filtering, and interactive approximate protocols with statistical security can yield much more practical solutions.

We have also tackled the issue of the limitation to fixed-point precision when working with encrypted values, resorting to analytical studies on the impact of finite-precision in the output error of the used adaptive filters, during the transient period and in steady-state regime, particularizing the expressions to each of the studied cases. The fast protocols that we have introduced are almost as robust as the original (B)LMS algorithm with respect to quantization errors, while presenting low computational and communication complexity.

This disclosure covers the two main problems of any secure adaptive filtering algorithm, namely cipher blowup and precision limits due to the use of fixed point arithmetic.

While particular embodiments have been described, it is understood that, after learning the teachings contained in this disclosure, modifications and generalizations will be apparent to those skilled in the art without departing from the spirit of the disclosed embodiments. It is noted that the foregoing embodiments and examples have been provided merely for the purpose of explanation and are in no way to be construed as limiting. While the method and system have been described with reference to various embodiments, it is understood that the words which have been used herein are words of description and illustration, rather than words of limitation. Further, although the system has been described herein with reference to particular means, materials and embodiments, the actual embodiments are not intended to be limited to the particulars disclosed herein; rather, the system extends to all functionally equivalent structures, methods and uses, such as are within the scope of the appended claims. Those skilled in the art, having the benefit of the teachings of this specification, may effect numerous modifications thereto and changes may be made without departing from the scope and spirit of the disclosed embodiments in its aspects.

REFERENCES

[1] A. C. Yao, "Protocols for secure computations," in *Proceedings of the IEEE Symposium on Foundations of Computer Science*, 1982, pp. 160-164.

[2] O. Goldreich, S. Micali, and A. Widgerson, "How to play any mental game," in *Proceedings of the nineteenth annual ACM conference on Theory of Computing*. New York, U.S.A.: ACM Press, 1987, pp. 218-229.

[3] C. Gentry, "Fully homomorphic encryption using ideal lattices," in *Proceedings of the 41st annual ACM symposium on Theory of computing, STOC'09*. Bethesda, Md., USA: ACM Press, May-June 2009, pp. 169-178.

[4] "Signal Processing in the EncryptEd Domain project (SPEED)." [Online]. Available: http://www.speedproject.eu/

[5] T. Bianchi, A. Piva, and M. Barni, "On the Implementation of the Discrete Fourier Transform in the Encrypted Domain," *IEEE Transactions on Information Forensics and Security*, vol. 4, no. 1, pp. 86-97, 2009.

[6] ——, "Encrypted Domain DCT based on Homomorphic Cryptosystems," *EURASIP Journal on Information Security*, vol. 2009, no. Article ID 716357, 2009.

[7] T. Bianchi, A. Piva, and M. Barni, "Composite Signal Representation for Fast and Storage-Efficient Processing of Encrypted Signals," *IEEE Trans. on Information Forensics and Security*, vol. 5, no. 1, pp. 180-187, March 2010.

[8] V. Kolesnikov, A. -R. Sadeghi, and T. Schneider, "How to Combine Homomorphic Encryption and Garbled Circuits—Improved Circuits and Computing the Minimum Distance Efficiently," in *SPEED Workshop*, Lausanne, Switzerland, September 2009, pp. 100-121.

[9] J. Canny, "Collaborative filtering with privacy," in *Security and Privacy, 2002. Proceedings. 2002 IEEE Symposium on*, 2002, pp. 45-57.

[10] Z. Erkin, T. Veugen, T. Toft, and R. L. Lagendijk, "Privacy-Preserving Centralized Recommender System," in *ACM SIGKDD Conference on Knowledge Discovery and Data Mining*, 2010.

[11] G. Jagannathan, K. Pillaipakkamnatt, and D. Umano, "A Secure Clustering Algorithm for Distributed Data Streams," in *Data Mining Workshops, 2007. ICDM Workshops 2007. Seventh IEEE International Conference on*, 28-31 2007, pp. 705-710.

[12] R. Rivest, L. Adleman, and M. Dertouzos, "On data banks and privacy homomorphisms," in *Foundations of Secure Computation*. Academic Press, 1978, pp. 169-177.

[13] P. Paillier, "Public-key cryptosystems based on composite degree residuosity classes," in *Advances in Cryptology—EUROCRYPT 1999*, ser. Lecture Notes in Computer Science, vol. 1592. Springer, 1999, pp. 223-238.

[14] I. Damgård, M. Geisler, and M. KrØigaard, "Efficient and Secure Comparison for On-Line Auctions," in *Australasian Conference on Information Security and Privacy—ACSIP 2007*, ser. LNCS, vol. 4586. Springer, July 2007, pp. 416-430.

[15] I. Damgård and M. Jurik, "A generalisation, a simplification and some applications of Paillier's probabilistic public-key system," in *Public Key Crytography* 2001, ser. Lecture Notes in Computer Science, K. Kim, Ed., vol. 1992. Cheju Island, Korea: Springer, February 2001, pp. 119-136.

[16] N. Smart and F. Vercauteren, "Fully Homomorphic Encryption with Relatively Small Key and Ciphertext Sizes," in *13th International Conference on Practice and Theory in Public Key Cryptography* 2010, ser. LNCS, vol. 6056, Paris, France, May 2010, pp. 420-443.

[17] A. Shamir, "How to share a secret," *Communications of the ACM*, vol. 22, no. 11, pp. 612-613, 1979.

[18] I. Damgård, M. Fitzi, E. Kiltz, J. B. Nielsen, and T. Toft, "Unconditionally secure constant-rounds multi-party computation for equality, comparison, bits and exponentiation," in *Proceedings of the third Theory of Cryptography Conference, TCC 2006*, ser. Lecture Notes in Computer Science, vol. 3876. Springer-Verlag, 2006, pp. 285-304.

[19] T. Nishide and K. Ohta, "Constant-round multiparty computation for interval test, equality test, and comparison," *IEICE Transactions on Fundamentals of Electronics, Communications and Computer Sciences*, vol. E90-A, no. 5, pp. 960-968, May 2007.

[20] B. Schoenmakers and P. Tulys, "Efficient binary conversion for Paillier encrypted values," in *Advances in Cryptology—EUROCRYPT 2006*, ser. Lecture Notes in Computer Science, vol. 4004. Springer, 2006, pp. 522-537.

[21] M. Franz, S. Katzenbeisser, S. Jha, K. Hamacher, H. Schroeder, and B. Deiseroth, "Secure computations on non-integer values," in *IEEE WIFS'10*. Seattle, USA: IEEE, December 2010.

[22] V. Kolesnikov and T. Schneider, "Improved garbled circuit: Free XOR gates and applications," in *ICALP '08*, ser. LNCS, vol. 5126. Springer, 2008, pp. 486-498.

[23] Y. Ishai, J. Kilian, K. Nissim, and E. Petrank, "Extending Oblivious Transfer Efficiently," in *Advances in Cryptology CRYPTO '03*, vol. 2729, 2003, pp. 145-161.

[24] N. Koblitz, "Elliptic curve cryptosystems," *Mathematics of Computation*, vol. 48, no. 177, pp. 203-209, January 1987.

[25] H. Lipmaa, "Verifiable homomorphic oblivious transfer and private equality test," in *ASIACRYPT'01*, ser. LNCS, vol. 2894. Springer, 2003.

[26] G. Clark, S. Mitra, and S. Parker, "Block implementation of adaptive digital filters," *Acoustics, Speech and Signal Processing, IEEE Transactions on*, vol. 29, no. 3, pp. 744-752, June 1981.

[27] J. R. Troncoso-Pastoriza and F. Pérez-González, "University of Vigo Technical Report UV/DTC/JRTP/22/12/2010," University of Vigo, Tech. Rep., September 2010. [Online]. Available: http://www.gts.tsc.uvigo.es/~troncoso/Tech_rep_UV_DTC_JRTP_22_12_2010.pdf

[28] S. T. Alexander, *Adaptive Signal Processing*. Springer-Verlag, 1986.

[29] E. Eweda, N. Yousef, and S. El-Ramly, "Reducing the Effect of Finite Wordlength on the Performance of an LMS Adaptive Filter," in *EEE International Conference on Signal Communications*, Atlanta, Ga., USA, June 1998, pp. 688-692.

[30] S. Alexander, "Transient weight misadjustment properties for the finite precision LMS algorithm," *Acoustics, Speech and Signal Processing, IEEE Transactions on*, vol. 35, no. 9, pp. 1250-1258, September 1987.

[31] S. Haykin, *Adaptive Filter Theory*, fourth edition ed., ser. Information and System Sciences. Prentice Hall, 2002.

[32] "Crypto++ Library." [Online]. Available: http://www.cryptopp.com/

[33] "GNU MP Bignum Library." [Online]. Available: http://gmplib.org/

[34] J. R. Troncoso-Pastoriza, "PrivateLMS: Prototype Protocols for the Private Execution of the LMS algorithm," August 2010. [Online]. Available: http://www.gts.tsc.uvigo.es/~troncoso/privatelmsimplementation

The invention claimed is:

1. A method for secure iterative processing of encrypted signals, comprising:
   (a) implementing a secure iterative processing protocol that avoids cipher blowup wherein said protocol comprises applying homomorphic linear processing, preparing and applying a rescaling module to avoid cypher blowup, homomorphically adapting said encrypted signals, and generating encrypted outputs until iterative processing is completed; and
   (b) configuring a hardware processor for executing an iterative algorithm based on said secure iterative processing protocol to perform adaptive filtering directly on said encrypted signals to generate an encrypted processed output signal, whereby said iterative algorithm performs secured computations, signal processing, and adaptive filtering directly on encrypted signals in untrusted environments without the need to decrypt said encrypted signals.

2. The method of claim 1, wherein said secure iterative processing protocol and said iterative algorithm implement an iterative adaptive filtering algorithm.

3. The method of claim 2, wherein said secure iterative processing protocol implements an iterative adaptive filtering algorithm by homomorphically adapting said encrypted signals.

4. The method of claim 3, wherein said adaptive filtering algorithm is a stochastic gradient algorithm, a square-root adaptive filter, an order recursive adaptive filter, a fast transversal filter, or a combination thereof.

5. The method of claim 4, wherein said adaptive filtering algorithm is a Least Mean Squares (LMS), Block Least Mean Squares (BLMS), Recursive Least Squares (RLS), QR decomposition Recursive Least Squares (QR-RLS), QR decomposition based Least Squares Lattice (QRD-LSL), recursive Least Squares Lattice (LSL), or a combination thereof.

6. The method of claim 2, wherein said secure iterative processing protocol implements a non-collaborative secure adaptive filter.

7. The method of claim 6, wherein said non-collaborative secure adaptive filter is based on data coming from one party or a group of parties and said adaptive filter coming from a second party or a group of parties with privacy bidirectionally preserved.

8. The method of claim 7, wherein said secure iterative processing protocol implements a two-party secure adaptive filtering.

9. The method of claim 8, wherein said two-party secure adaptive filtering comprises applying homomorphic encryption, applying interactive secure protocols, applying garbled circuits, or a combination thereof.

10. The method of claim 9, wherein said two-party secure adaptive filtering is based on a hybrid adaptive filtering method.

11. The method of claim 9, wherein said two-party secure adaptive filtering is based on a rounding and unpacking method.

12. The method of claim 9, wherein said two-party secure adaptive filtering is based on a homomorphic processing (HP) privateLMS protocol.

13. The method of claim 9, wherein said two-party secure adaptive filtering is based on a garbled circuit (GC) privateLMS protocol.

14. The method of claim 9, wherein said two-party secure adaptive filtering is based on a hybrid (Hy) privateLMS protocol.

15. The method of claim 9, wherein said two-party secure adaptive filtering is based on a hybrid block (HB) privateLMS protocol.

16. An apparatus for secure iterative processing of encrypted signals, comprising:
  (a) a processor configured for 1) implementing a secure iterative processing protocol that avoids cipher blowup wherein said protocol comprises applying homomorphic linear processing, preparing and applying a rescaling module to avoid cypher blowup, homomorphically adapting said encrypted signals, and generating encrypted outputs until iterative processing is completed; and 2) applying an iterative algorithm based on said secure iterative processing protocol to perform adaptive filtering directly on said encrypted signals to generate an encrypted processed output signal; and
  (b) an output interface for outputting said encrypted processed output signal, whereby said iterative algorithm performs secured computations, signal processing, and adaptive filtering directly on encrypted signals in untrusted environments without the need to decrypt said encrypted signals.

\* \* \* \* \*